(12) United States Patent
Cooper et al.

(10) Patent No.: US 12,717,800 B2
(45) Date of Patent: Aug. 25, 2026

(54) DATA MINING SYSTEM USING ARTIFICIAL INTELLIGENCE

(71) Applicant: State Farm Mutual Automobile Insurance Company, Bloomington, IL (US)

(72) Inventors: Nicholas Cooper, Chicago, IL (US); Talitha Templeton, Bennington, VT (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/883,745

(22) Filed: Sep. 12, 2024

(65) Prior Publication Data

US 2026/0030254 A1 Jan. 29, 2026

Related U.S. Application Data

(60) Provisional application No. 63/675,629, filed on Jul. 25, 2024.

(51) Int. Cl.

| | |
|---|---|
| ***G06F 16/2458*** | (2019.01) |
| ***G06F 16/93*** | (2019.01) |
| ***G06F 40/177*** | (2020.01) |
| ***G06F 40/289*** | (2020.01) |
| ***G06V 30/413*** | (2022.01) |

(52) U.S. Cl.

CPC .......... *G06F 16/2465* (2019.01); *G06F 16/93* (2019.01); *G06F 40/177* (2020.01); *G06F 40/289* (2020.01); *G06V 30/413* (2022.01)

(58) Field of Classification Search

CPC .... G06F 16/2465; G06F 16/93; G06F 40/289; G06F 40/177; G06V 30/413; G06Q 40/08

See application file for complete search history.

(56) References Cited

U.S. PATENT DOCUMENTS

| | | | | |
|---|---|---|---|---|
| 8,595,103 | B1 * | 11/2013 | Wargin | G06Q 10/06 705/38 |
| 8,600,970 | B2 * | 12/2013 | Abbott | G06F 3/00 707/711 |

(Continued)

OTHER PUBLICATIONS https://www.rootsautomation.com/blogs-and-news/large-language-models-llm-a-game-changer-for-insurance.

(Continued)

*Primary Examiner* — William P Bartlett
(74) *Attorney, Agent, or Firm* — Foley & Lardner LLP

(57) ABSTRACT

A system for analyzing documents may (1) retrieve a document filed by a third-party entity including metadata relating to the document; (2) extract media embedded in the document and generate a media file containing the extracted media and a text file containing extracted text; (3) analyze the media file to identify and extract data from within the extracted media; and/or (4) process the text file or a text file generated from the text file to generate text portions from the extracted text. The system may (5) generate embeddings for the text portions; and/or (6) generate a dataset including the text portions, the embeddings, and the metadata. The dataset may be configured to be queried to provide contextual data regarding the document from the text portions. The system may also (7) process the dataset to identify product modifications or new products based on the dataset.

20 Claims, 17 Drawing Sheets

(56) References Cited

U.S. PATENT DOCUMENTS

| | | | | |
|---|---|---|---|---|
| 2006/0193525 | A1* | 8/2006 | Ishii | G06T 1/0021 382/232 |
| 2012/0324341 | A1* | 12/2012 | Dejean | G06F 40/103 715/243 |
| 2020/0042785 | A1* | 2/2020 | Burdick | G06V 30/416 |
| 2021/0312560 | A1* | 10/2021 | Hayward | G06N 3/088 |
| 2022/0301072 | A1* | 9/2022 | Wang | G06F 40/279 |
| 2024/0289375 | A1* | 8/2024 | Park | G06F 16/383 |
| 2025/0232380 | A1* | 7/2025 | Pasricha | G06Q 40/08 |

OTHER PUBLICATIONS

Nunes, Paulo. “Two Impulse: Blog—Impact of Large Language Models in Insurance.” Two Impulse | Blog—Impact of Large Language Models in Insurance, Dec. 18, 2022, www.twoimpulse.com/en/insights/large-language-models-insurance.

Van Dam, Daniel, and Raymond van Es, “The Potential of Large Language Models in the Insurance Sector,” Milliman, Feb. 7, 2024, www.milliman.com/en/insight/potential-of-large-language-models-insurance-sector.

* cited by examiner

DATA MINING SYSTEM USING ARTIFICIAL INTELLIGENCE

FIELD OF THE INVENTION

The present disclosure relates generally to document analysis systems. More particularly, some example embodiments relate to using artificial intelligence (AI), such as machine learning (ML) models (including, but no limited to, generative AI models), to analyze various documents and generate search results based upon the analysis.

BACKGROUND

Information about insurance companies is shared through publicly available insurance product filings. These documents are prepared in a format unique to the insurance industry, which in turn requires a unique means of processing the documents that are prepared according to this format. It would be beneficial to provide an AI-based solution to assist insurance personnel with processing these insurance product filings and conducting competitor research within their industry.

BRIEF SUMMARY

A document analysis system may be provided that analyzes publicly available documents retrieved from a database. For instance, the document may include metadata associated therewith that relates to the document. In some embodiments, media, text, and attachments may be extracted from the retrieved documents such that the documents may be formatted in a way that is compatible with machine learning models. The extracted data (e.g., the media, text, and attachments) may be processed separately by machine learning (e.g., a computer vision model, a text extraction model, an embedding model, etc.) and stored such that the extracted data may be provided to a user in response to a search query related to the documents.

In one aspect, a system for analyzing documents may be provided. The system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another.

For example, in one instance, the system may include one or more processors and one or more non-transitory memories storing processor-executable instructions that, when executed by the one or more processors, cause the system to perform several operations, including (1) retrieving, from a publicly available database of the documents, a document, where the document includes metadata relating to the document; (2) extracting media embedded in the document and generating a media file containing the extracted media and a text file containing extracted text; (3) analyzing, using a computer-vision model, the media file to identify and extract data from within the extracted media; (4) processing, using a text extraction model, at least one of the text file or a text file generated from the text file to generate a plurality of text portions from the extracted text; (5) generating, using an embedding model, a plurality of embeddings for the plurality of text portions; (6) generating a dataset comprising the plurality of text portions, the plurality of embeddings, and at least a portion of the metadata, where the dataset is configured to be queried to provide contextual data regarding the document from the plurality of text portions; and/or (7) processing the dataset to identify one or more product modifications to one or more products or to identify one or more new products based on information from the dataset. The computer system may include additional, less, or alternate functionality and/or operations, including that discussed elsewhere herein.

In some implementations, the functionality and/or operations may include generating at least one of a table, a textual summary, or a comma-separated value format comprising the extracted data. The extracted text may be identified by a machine learning model using vectorization. In certain implementations, the vectorization may include storing the plurality of embeddings in a vector database so that the vector database is configured to be queried against by a user and such that the plurality of text portions may be identified from the vector database.

In certain embodiments, the functionality and/or operations may include (i) generating a modified text version of the text file by applying one or more modification rules to the text file, and (ii) generating the plurality of text portions from the modified text version of the text file. In various embodiments, the metadata may include at least one of a unique document identifier, a date of last modification to the document, a date of submission of the document, an entity responsible for submitting the document, or a subgroup to which the entity responsible for submitting the document belongs.

Additionally or alternatively, the functionality and/or operations may include (i) receiving, from a user, a query related to the dataset; (ii) processing, using the embedding model, the query to determine a correspondence between the query and a subset of the plurality of embeddings; (iii) identifying, from the dataset based upon the determined correspondence, a subset of the plurality of text portions associated with the subset of the plurality of embeddings; (iv) retrieving a subset of documents associated with the subset of the plurality of text portions; and/or (v) displaying, to the user via a graphical user interface, at least one of the subset of the plurality of text portions or a subset of the metadata associated with the subset of documents.

In various implementations, the subset of documents is identified based upon one or more search parameters associated with the query. In such implementations, the functionality and/or operations may include (i) receiving, from the user via the graphical user interface, an updated search parameter; (ii) identifying, based upon the updated search parameter, an updated subset of documents; and (iii) displaying, to the user via the graphical user interface, at least one of an updated subset of the plurality of text portions or an updated subset of the metadata associated with the updated subset of documents.

In some implementations, the one or more search parameters include at least one of keyword weight or a vector weight, and the functionality and/or operations may include filtering the subset of documents based upon the at least one of the keyword weight or the vector weight. In certain embodiments, the functionality and/or operations may include notifying, based upon a request to receive a notification, a user that at least one of a keyword, a phrase, or an entity is detected among the extracted text.

In another aspect, a computer-implemented method for analyzing documents filed by a plurality of third-party entities may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another.

In one instance, the computer-implemented method may include, such as via one or more local or remote processors, transceivers, sensors, other electronic components, including those discussed elsewhere herein, and/or computer-readable storage media having instructions stored thereon executable by the processors, transceivers, sensors, and/or other electronic components, (1) retrieving, from a publicly available database of the documents filed by the plurality of third-party entities, a document filed by a third-party entity of the plurality of third-party entities, where the document includes metadata relating to the document and to the third-party entity; (2) extracting media embedded in the document and generating a media file containing the extracted media and a text file containing extracted text; (3) analyzing, using a computer-vision model, the media file to identify and extract data from within the extracted media; (4) processing, using a text extraction model, at least one of the text file or a text file generated from the text file to generate a plurality of text portions from the extracted text; (5) generating, using an embedding model, a plurality of embeddings for the plurality of text portions; (6) generating a dataset comprising the plurality of text portions, the plurality of embeddings, and at least a portion of the metadata, where the dataset is configured to be queried to provide contextual data regarding the document and the third-party entity from the plurality of text portions; and/or (7) processing the dataset to identify one or more product modifications to one or more products or to identify one or more new products based on information from the dataset. The method may include additional, less, or alternate functionality, including that discussed elsewhere herein.

For instance, the computer-implemented method may include, such as via one or more processors and/or other electronic components, (i) receiving, from a user, a query related to the dataset; (ii) processing, using the embedding model, the query to determine a correspondence between the query and a subset of the plurality of embeddings; (iii) identifying, from the dataset based upon the determined correspondence, a subset of the plurality of text portions associated with the subset of the plurality of embeddings; (iv) retrieving a subset of documents associated with the subset of the plurality of text portions; and/or (v) displaying, to the user via a graphical user interface, at least one of the subset of the plurality of text portions or a subset of the metadata associated with the subset of documents.

Additionally or alternatively, the computer-implemented method may include, such as via one or more processors and/or other electronic components, (i) receiving, from the user via the graphical user interface, an updated search parameter; (ii) identifying, using the one or more processors and based upon the updated search parameter, an updated subset of documents; and/or (iii) displaying, using the one or more processors and to the user via the graphical user interface, at least one of an updated subset of the plurality of text portions or an updated subset of the metadata associated with the updated subset of documents.

In some implementations, the one or more search parameters include at least one of keyword weight or a vector weight. In such implementations, the computer-implemented method may include, such as via one or more processors and/or other electronic components, includes filtering the subset of documents based upon the at least one of the keyword weight or the vector weight. In certain embodiments, the computer-implemented method may include, such as via one or more processors and/or other electronic components, notifying, based upon a request to receive a notification, a user that at least one of a keyword, a phrase, or an entity is detected among the extracted text.

According to some instances, the computer-implemented method may include, such as via one or more processors and/or other electronic components, generating at least one of a table, a textual summary, or a comma-separated value format comprising the extracted data. Additionally or alternatively, the computer-implemented method may include, such as via one or more processors and/or other electronic components, (i) generating a modified text version of the text file by applying one or more modification rules to the text file; and/or (ii) generating the plurality of text portions from the modified text version of the text file. In some implementations, the extracted text is identified by a machine learning model using vectorization. According to such implementations, the vectorization may include storing the plurality of embeddings in a vector database so that the vector database is configured to be queried against by a user and such that the plurality of text portions may be identified from the vector database.

In another aspect, a non-transitory computer readable medium having instructions stored thereon that, when executed by one or more processors, cause the one or more processors to perform various functionality and operations. For instance, the functionality and operations may include or direct (1) retrieving, from a publicly available database of documents filed by a plurality of third-party entities, multiple documents, where each of the multiple documents include metadata, and where the multiple documents relate to multiple topics and the plurality of third-party entities; (2) extracting media embedded in the multiple documents and generating a media file containing the extracted media and a text file containing extracted text; (3) analyzing, using a computer-vision model, the media file to identify and extract data from within the extracted media; (4) processing, using a text extraction model, at least one of the text file or a text file generated from the text file to generate a plurality of text portions from the extracted text; (5) generating, using an embedding model, a plurality of embeddings for the plurality of text portions; (6) generating a dataset comprising the plurality of text portions, the plurality of embeddings, and at least a portion of the metadata, where the dataset is configured to be queried to provide contextual data regarding the multiple documents and the plurality of third-party entities from the plurality of text portions; (7) receiving, from a user, a query related to the dataset; (8) processing, using the embedding model, the query to determine a correspondence between the query and a subset of the plurality of embeddings; (9) identifying, from the dataset based upon the determined correspondence, a subset of the plurality of text portions associated with the subset of the plurality of embeddings; (10) retrieving a subset of documents associated with the subset of the plurality of text portions; (11) displaying, to the user via a graphical user interface, at least one of the subset of the plurality of text portions or a subset of the metadata associated with the subset of documents; and/or (12) processing the dataset to identify one or more product modifications to one or more products or to identify one or more new products based on information from the dataset.

The instructions may direct additional, less, or alternate functionality and/or operations, including that discussed elsewhere herein.

In certain embodiments, the functionality and operations may include or direct (i) receiving, from the user via the graphical user interface, an updated search parameter; (ii) identifying, based upon the updated search parameter, an updated subset of documents; and/or (iii) displaying, to the user via the graphical user interface, at least one of an updated subset of the plurality of text portions or an updated subset of the metadata associated with the updated subset of documents.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

There are shown in the drawings arrangements which are presently discussed, it being understood, however, that the present embodiments are not limited to the precise arrangements and are instrumentalities shown, wherein.

Figure 1:
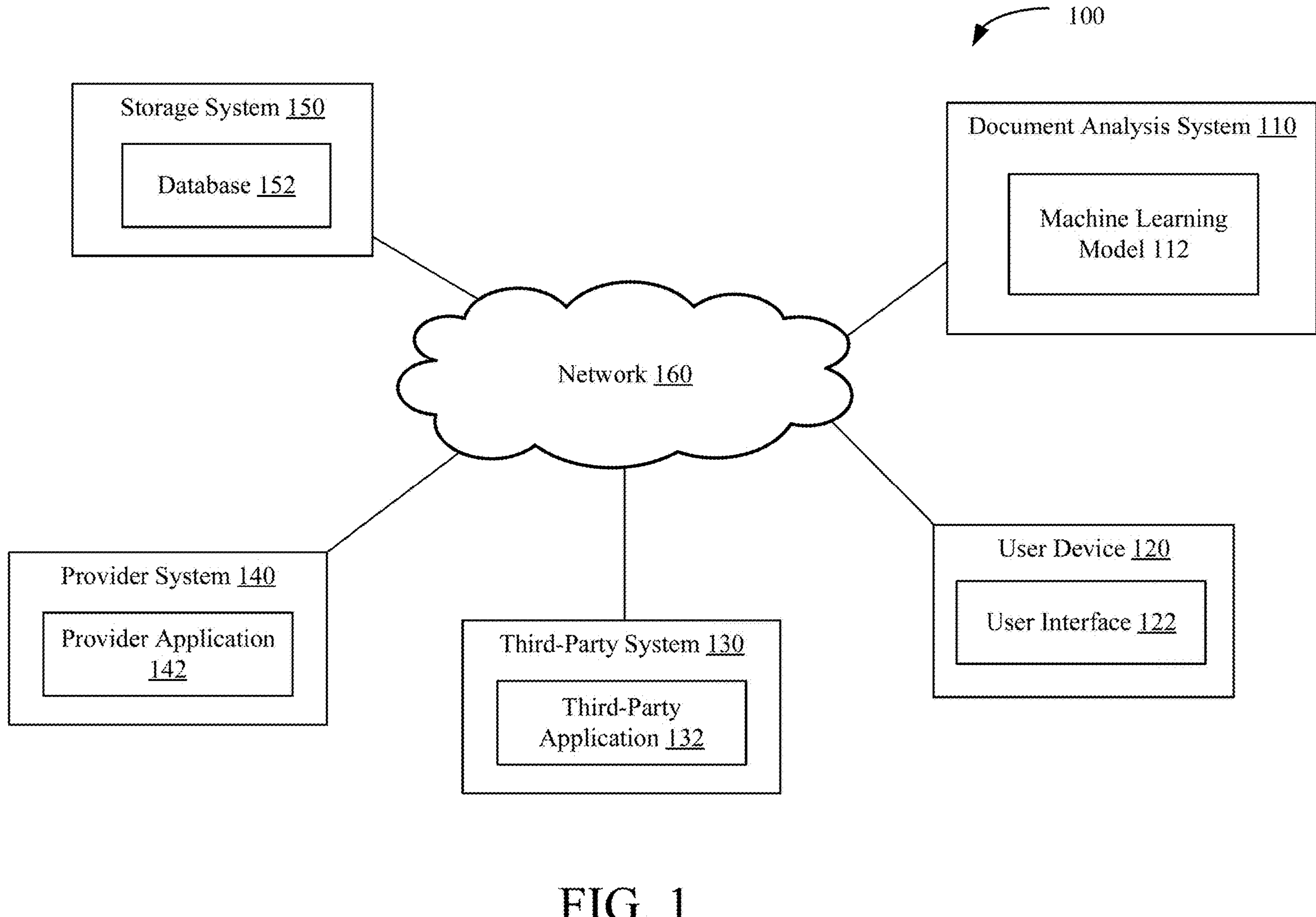
FIG. 1 is a block diagram of an exemplary computing system, according to some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Various example embodiments of the present disclosure relate to, inter alia, a document analysis system that analyzes and processes, using various artificial intelligence models, publicly available documents such that the documents may be queried by a user. In some embodiments, the system retrieves the documents, and metadata related therewith, from a publicly available database. The documents, however, may include information/data of a format incompatible with query processing techniques (e.g., natural language processing). The system may then extract media embedded in the document and process extracted text from the document to generate a plurality of text portions. From the text portions, the system may generate a plurality of embeddings corresponding to the text portions and may generate a dataset including the plurality of text portions, the plurality of embeddings, and at least a portion of the metadata such that the dataset may provide information responsive to a query relating to the document. While various embodiments relate to processing publicly available documents, it should be understood that, in some implementations, the features of the present disclosure may additionally or alternatively be utilized to process documents that are not publicly available.

Overview

Referring to the Figures, computer systems and computer-implemented methods for analyzing documents are provided. For example, the computer system may be configured to retrieve a document filed by a third-party entity and various metadata relating to the document from a publicly available database of documents. From the retrieved document, the system may extract media embedded in the document and generate a media file containing the extracted media and a text file containing extracted text. In some instances, a computer-vision model analyzes the media file to identify and extract data from within the extracted media such that the data may be provided to a user in response to a query. A text extraction model may process at least one of the text file or a text file generated from the text file to generate a plurality of text portions from the extracted text, and an embedding model may generate a plurality of embeddings for the plurality of text portions. The system may also generate a dataset including the plurality of text portions, the plurality of embeddings, and at least a portion of the metadata. The dataset may be queried to provide contextual data regarding the document from the plurality of text portions. In some instances, information from the dataset may be used to suggest one or more modifications to a product or one or more new products.

One technical advantage of various embodiments of the present disclosure is optimization of document analysis by using various machine learning models to analyze and process complex documents with varying formats such that the documents may be queried using natural language processing. This technological advantage improves processing power by reducing the amount of time and resources (e.g., human resources, computing algorithms, etc.) to perform the processes described herein. Another technical improvement provided by various implementations is reducing the amount of user (e.g., insurance agent, analyst, etc.) intervention needed to analyze the documents and perform the processes described herein.

Exemplary Computing System With Document Analysis System

Referring to FIG. 1, a block diagram of an exemplary computing system, shown as computing system 100, is shown, according to some embodiments. The computing system 100 may include a document analysis system 110 having at least one machine learning model 112 and a user device 120 having a user interface 122. The computing system 100 may also include a third-party system 130 having a third-party application 132, a provider system 140 having a provider application 142, and a storage system 150 having a database 152. The components of the computing system 100 may be connected, or in wired or wireless communication, via a network 160. It should be noted that the number and type of components shown are merely illustrative and, in various embodiments, implementations of the computing system 100 may have additional, fewer, and/or different components than those illustrated in FIG. 1, including those mentioned elsewhere herein.

Referring still to FIG. 1, according to some embodiments, the document analysis system 110 may be configured to communicate with components of the computing system 100. For example, information and/or data associated with the user device 120 may be communicated to the document analysis system 110 (e.g., via the network 160). Information and/or data associated with the third-party system 130 and/or the provider system 140 may also be communicated to the document analysis system 110 (e.g., via the network 160). Information and/or data associated with the storage system 150 may also be communicated to the document analysis system 110 (e.g., via the network 160).

In some embodiments, the document analysis system 110 may be implemented using cloud computing services. The document analysis system 110 may be implemented using one or more computing devices, for example operating alone and/or in combination. The document analysis system 110 may be implemented using computing architectures like multiple distributed servers, and/or similar computing devices and/or systems. In various implementations, the document analysis system 110 may be another suitable computing system, for example distributed across multiple systems or devices or within a single computer (e.g., one server, housing, etc.). All such implementations are contemplated herein.

As shown in FIG. 1, the document analysis system 110 includes the machine learning model 112. While the document analysis system 110 is shown to include one machine learning model 112, it is contemplated herein that the document analysis system 110 may include a plurality of machine learning models 112. The machine learning model 112 may utilize machine learning, generative artificial intelligence, or other advanced computing techniques. As such, the machine learning model 112 may employ supervised, unsupervised, and/or semi-supervised machine learning techniques, which may be followed by, and/or used in conjunction with, reinforced and/or reinforcement learning techniques. In some embodiments, the machine learning model 112 may generate audible or verbal output, text or textual output (e.g., as shown on user interface 800, as described below with reference to FIGS. 8A-8D), visual or graphical output (e.g., as shown on user interface 900, as described below with reference to FIGS. 9A and 9B), output for use with speakers and/or display screens of a mobile computing device (e.g., user device 120), and/or other types of output for user and/or other computer consumption.

Noted above, the machine learning model 112 may be configured to implement machine learning, such that the machine learning model 112 "learns" to analyze, organize, and/or process data without being explicitly programmed. For example, as described herein, the machine learning model 112 may be configured to receive document information (e.g., third-party data from the third-party system 130, contextual information from the provider system 140, files stored in the database 152, etc.) such that the machine learning model 112 is trained to analyze documents and transform the documents into a format that enables a user to query the documents. As the document analysis system 110 receives additional data (e.g., by performing the functions described herein over time), the machine learning model 112 is retrained based upon the additional data such that the machine learning model 112 may perform more accurate analyses and generate more relevant search results for a user engaging with the document analysis system 110.

As shown, the document analysis system 110 may be configured to communicate with the user device 120. The user device 120 may include one or more human-machine interfaces or analyst interfaces, shown as user interface 122 (e.g., a graphical user interface, a text-based computer interface, an analyst-facing web service, a web service that provides pages to an analyst, etc.), for example for controlling, viewing, and/or otherwise interfacing with the document analysis system 110. The user device 120 may include a personal mobile computing device (e.g., a smart phone, a tablet, a mobile device, a wearable, smart glasses, a smart watch, etc.). The user device 120 may include a computer workstation, an analyst terminal, a remote or local interface, and/or any other user interface device. The user device 120 may be a stationary terminal (e.g., a desktop computer, a laptop computer, a tablet, or another suitable non-mobile device).

In some implementations, information/data associated with the user device 120 may be communicated to the document analysis system 110. In certain embodiments, the user device 120 itself may be configured to communicate information/data to the document analysis system 110. In some implementations, a device coupled to the user device 120, a component implemented with the user device 120, an application or program housed and/or executed on the user device 120, and/or another suitable component associated with the user device 120 may be configured to communicate information/data to the document analysis system 110. The information/data associated with the user device 120 may be communicated to the machine learning model 112 such that the machine learning model 112 may be trained using the information/data associated with the user device 120.

The document analysis system 110 may also be configured to receive information/data associated with a user or operator associated with the user device 120. For example, the user device 120 may (e.g., automatically, or in response to an input from a user or operator, etc.) be configured to communicate information associated with a user or operator associated with one or more applications (e.g., housed or executed on the user device 120). In some embodiments, the user device 120 may also be configured to communicate information associated with trends or tendencies of a user or operator. The document analysis system 110 may also be configured to receive information associated with a product or service associated with a user or operator of the user device 120. According to some embodiments, the user device 120 may be configured to communicate historic information/data associated with a user or operator to the document analysis system 110, as well as information in real-time. The information/data associated with the user or operator may be communicated to the machine learning model 112 such that the machine learning model 112 may be trained using the information/data associated with the user or operator of the user device 120.

The document analysis system 110 may also be configured to receive data or information gathered and/or captured by the user device 120. For example, the user device 120 may include a microphone or camera (e.g., for capturing audiovisual information). The user device 120 may capture (e.g., automatically, and/or in response to an input by a user or operator) audiovisual data around the user device 120. The user device 120 may communicate the audiovisual information to the document analysis system 110. In some embodiments, the user device 120 may be configured to communicate audiovisual information (e.g., voice memos, voicemails, images, videos, etc.) stored on the user device 120 to the document analysis system 110.

As shown, the document analysis system 110 may be configured to receive information/data associated with the third-party system 130. The third-party system 130 may include a third-party application 132. While the computing system 100 is shown to include one third-party system 130, it is contemplated herein that the computing system 100 may include a plurality of third-party systems 130. Each of the plurality of third-party systems 130 may be associated with a respective third-party entity. The document analysis system 110 may be configured to receive information/data associated with the third-party system 130. For example, the third-party system 130 may be associated with a protective services provider (e.g., a competitor of a protective services provider associated with the provider system 140). The protective services provider associated with the third-party system 130 may be configured to provide protection record, protection products, policy-related information/data (e.g., rates, rules, forms, etc.), and so on. In certain embodiments, the protective services provider may be configured to provide historic policy-related information and/or policy-related information in real time. The information/data associated with the third-party system 130 may be communicated to the machine learning model 112 such that the machine learning model 112 may be trained using the information/data associated with the third-party system 130. For instance, the third-party system 130 may provide protective service-related documents to the document analysis system 110 to be analyzed by the machine learning model 112, as described herein. In some examples, protective services may include, for example, one or more of various types of insurance intended, for example, to provide protection for a home, automobile, other personal property, health, life, etc. of an individual.

As shown, information/data associated with the provider system 140 may be communicated to the document analysis system 110. The provider system 140 may be configured to communicate information/data to the document analysis system 110. In some embodiments, a device coupled to the provider system 140, a component implemented within the provider system 140, an application or program housed and/or executed on the provider system 140, and/or another suitable component associated with the provider system 140 may be configured to communicate information/data to the document analysis system 110.

The provider system 140 may include a provider application 142. In certain embodiments, the provider system 140 may be associated with a company or entity that provides protective services (e.g., insurance, etc.) to a user or operator, a company or service provider, and/or over one or more products or services. In various instances, the user or operator of the user device 120 is employed by the company or entity associated with the provider system 140. For instance, the user or operator of the user device 120 may be an insurance agent/analyst employed by an insurance company associated with the provider system 140. In certain embodiments, the provider system 140 may include the document analysis system 110, as described herein. The provider system 140 may be configured to communicate with the document analysis system 110 (and/or the user device 120), for example to provide one or more relevant documents and/or information in response to a search query. In some embodiments, the information/data associated with the provider system 140 may be communicated to the machine learning model 112 such that the machine learning model 112 may be trained using the information/data associated with the provider system 140.

As shown, the document analysis system 110 may be configured to communicate with the storage system 150 (e.g., having the database 152). In some embodiments, the document analysis system 110 communicates with the storage system 150, either directly (e.g., via the network 160) or indirectly (e.g., via the user device 120, etc.). The storage system 150 may include one or more devices (e.g., RAM, ROM, Flash memory, hard disk storage, etc.) for storing data and/or computer code for implementing and/or facilitating the various processes, layers, and/or circuits described herein. The storage system 150 may be or include volatile memory or non-volatile memory, and may include database components, object code components, script components, and/or any other type of information structure for supporting the various activities and information structures described herein.

In certain embodiments, and as will be discussed in greater detail, the document analysis system 110 may also be configured to generate data. For example, the document analysis system 110 may include components (e.g., a media extractor, a document analyzer, a database, a text processor, an embedding model, and a dataset generator) that obtain, analyze, process, generate, store, and/or communicate data. The components of the document analysis system 110 may perform the processes described herein wholly or at least partially using the machine learning model 112.

Exemplary Document Analysis Computer System

Figure 2:
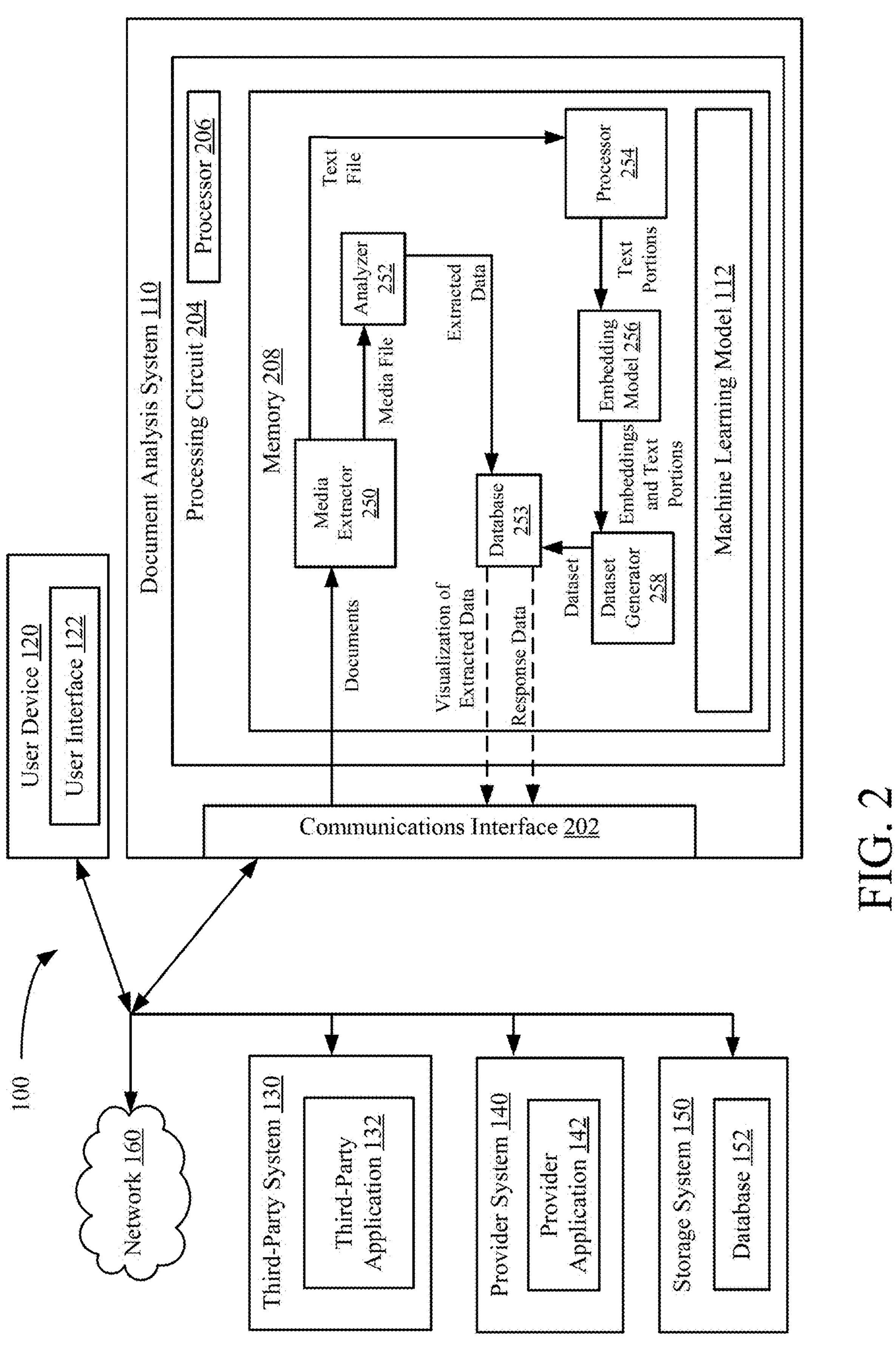
FIG. 2 is a block diagram of an exemplary document analysis system, according to some embodiments.

Referring now to FIG. 2, a block diagram of an exemplary document analysis system, e.g., the document analysis system 110, is shown in greater detail, according to some embodiments. As shown in FIG. 2, the document analysis system 110 may be communicably connected to the user device 120, the third-party system 130, the provider system 140, and the storage system 150 (e.g., via the network 160). The document analysis system 110 may be communicably connected to other suitable systems and/or devices (e.g., via the network 160), including those devices mentioned elsewhere herein. It should be understood that some or all of the components of the document analysis system 110, the user device 120, the third-party system 130, the provider system 140, the storage system 150, and/or the network 160 may be implemented as part of a cloud-based computing system configured to obtain, process, and/or communicate data from one or more external devices or sources.

Similarly, some, or all, of the components of the document analysis system 110, the user device 120, the third-party system 130, the provider system 140, the storage system 150, and/or the network 160 may be integrated within a single device or be distributed across multiple separate systems or devices. In certain embodiments, the document analysis system 110, the user device 120, the third-party system 130, the provider system 140, the storage system 150, and/or the network 160 are components of a controller, a device controller, a field controller, a computer work station, a client device, and/or another system or device that receives, processes, and/or communicates data from/to devices or other data sources.

As shown, the document analysis system 110 may include a communications interface 202, a processing circuit 204 having one or more processors 206, and one or more memories 208 (e.g., one or more computer-readable storage media having instructions stored thereon that are executed by the one or more processors 206) having the machine learning model 112. While the processing circuit 204, the processor 206, and the memory 208 are described herein in the singular for brevity, it should be understood that various embodiments may utilize two or more processing circuits, processors, and/or memories/computer-readable storage media in combination to perform the functions described herein with the singular components, and all such embodiments are contemplated within the scope of the present disclosure.

The communications interface 202 may include wired or wireless communications interfaces (e.g., jacks, antennas, transmitters, receivers, transceivers, wire terminals, etc.) for communicating data between the document analysis system 110 and external systems or devices (e.g., the user device 120, the third-party system 130, the provider system 140, the storage system 150, etc.). In some embodiments, the communications interface 202 facilitates communications between the document analysis system 110 and one or more external applications and/or interfaces (e.g., the user interface 122, the third-party application 132, the provider application 142, etc.), for example to allow a remote user or operator to control, monitor, and/or adjust components of the document analysis system 110.

Further, the communications interface 202 may be configured to communicate with external systems and/or devices using any of a variety of communications protocols (e.g., HTTP(S), WebSocket, CoAP, MQTT, etc.) and/or any of a variety of other protocols. Advantageously, the document analysis system 110 may obtain, ingest, and process data from any type of system or device, regardless of the communications protocol used by the system or device.

As shown, the document analysis system 110 may include the processing circuit 204 having the processor 206 and the memory 208. While shown as single components, it should be appreciated that the document analysis system 110 may include one or more processing circuits, including one or more processors and memory.

In some embodiments, the document analysis system 110 may include a plurality of processors, memories, interfaces, and/or other components distributed across multiple devices or systems, which are communicably coupled via a network (e.g., the network 160). For example, in a cloud-based or distributed implementation, the document analysis system 110 may include multiple discrete computing devices, each of which includes a processor 206, memory 208, communications interface 202, and/or other components of the document analysis system 110. Tasks performed by the document analysis system 110 may be distributed across multiple systems or devices, which may be located within a single building or facility or distributed across multiple buildings or facilities. In other embodiments, the document analysis system 110 itself may be implemented within a single computer (e.g., one server, one housing, etc.). All such implementations are contemplated herein.

The processor 206 may be a general purpose or specific purpose processor, an application specific integrated circuit (ASIC), one or more field programmable gate arrays (FPGAs), a group of processing components, or other suitable processing components. The processor 206 may further be configured to execute computer code or instructions stored in the memory 208 or received from other computer readable media (e.g., USB or other local storage, network storage, a remote server, etc.).

The memory 208 may include one or more devices (e.g., memory units, memory devices, storage devices, etc.) for storing data and/or computer code for completing and/or facilitating the various processes described in the present disclosure. For example, as shown in FIG. 2, the memory 208 may include the machine learning model 112, and the machine learning model 112 may be configured to complete and/or facilitate the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. In some implementations, the memory 208 may include database components, object code components, script components, and/or any other type of information structure for supporting the various activities and information structures described in the present disclosure. The memory 208 may be communicably connected to the processor 206 via the processing circuit 204, and may include computer code for executing (e.g., by the processor 206) one or more processes described herein. When the processor 206 executes instructions stored in the memory 208, the processor 206 may configure the processing circuit 204 to complete such activities.

As shown, the document analysis system 110 (e.g., the memory 208) may include a media extractor 250, a document analyzer, shown as an analyzer 252, a database 253, a text processor, shown as processor 254, an embedding model 256, and a dataset generator 258. The following paragraphs describe some of the general functions performed by each of the components 250-258 of the document analysis system 110. In some embodiments, the machine learning model 112 may wholly or partially perform the functions performed by each of the components 250-258, as described herein. It should be noted that the number and type of components shown are merely illustrative and, according to various embodiments, implementations of the document analysis system 110 may have additional, fewer, and/or different components than those illustrated in FIG. 2.

The media extractor 250 may be configured to obtain input data, analyze the input data, and/or generate output data to be communicated to other components of the document analysis system 110. For example, the media extractor 250 may obtain (e.g., receive, request, pull, etc.) documents. The documents include data/information relating to an industry (e.g., insurance) in which the document analysis system 110 is analyzing documents. The documents may be received from an external system or device (e.g., an edge device, the third-party system 130, the database 152, etc.), for example via the communications interface 202. In some embodiments, the media extractor 250 may obtain the documents, analyze the documents, and/or generate the output data to be communicated to other components of the document analysis system 110 using the machine learning model 112.

According to some embodiments, the documents may relate to be insurance-related filings from a third-party entity (e.g., a protective services provider) that competes with an entity (e.g., a protective services provider) associated with the provider system 140. For example, the documents may relate to protection records including, without limitations, insurance claims, policyholder reports, inspection reports, customer service interactions, or any other related documentation. Alternatively or additionally, the documents may include protection products relating to one or more policies (and/or endorsements) that may include at least one of a homeowner policy, a life policy, an automotive policy, renters' policy, a personal articles policy, a parametric policy, various or related endorsements, or a health policy. In some instances, the protection products may further include, without limitations, insurance products, extended warranties, service contracts, mitigation services, or any other related offerings. Such documents may be retrieved from a publicly available database of documents (e.g., from the third-party system 130, the storage system 150, etc.). The documents may have metadata associated therewith, and the media extractor 250 may also receive the metadata associated with each of the documents. For instance, the metadata may include a unique document identifier, a date of last modification to the document, a date of submission of the document, the third-party entity responsible for submitting the document, a subgroup to which the third-party entity responsible for submitting the document belongs, and so on.

As shown, the media extractor 250 may be configured to obtain input data (e.g., the documents, etc.), analyze the input data, and/or generate output data. For example, the media extractor 250 (e.g., using the machine learning model 112) may be configured to obtain (e.g., retrieve, receive, request, pull, etc.) documents, analyze (e.g., compile, process, etc.) the documents, and extract media (e.g., attachments, hyperlinks, images, tables, graphs, etc.) that are embedded in the documents. From the extracted media, the media extractor 250 may further generate a media file containing the extracted media and a text file containing extracted text from the documents (e.g., text that remains after the media is extracted from the document). The media file and the text file may be communicated to another component of the document analysis system 110 (e.g., the analyzer 252, the processor 254, etc.).

The analyzer 252 may be configured to obtain input data, analyze the input data, and/or generate output data to be communicated to other components of the document analysis system 110. In some embodiments, the analyzer 252 may obtain the input data, analyze the input data, and/or generate the output data to be communicated to other components of the document analysis system 110 using the machine learning model 112. For example, the analyzer 252 (e.g., the machine learning model 112) may obtain (e.g., receive, request, pull, etc.) and analyze the media files from the media extractor 250. In some implementations, the analyzer 252 is a computer-vision model used to identify and extract data from within the extracted media. The extracted data may be stored in a database 253. In certain implementations, the document analysis system 110 may generate a visualization of the extracted data (e.g., a table, text, a comma-separated value format, etc.) and may communicate the visualization to another system/device in the computing system 100 (e.g., the user device 120, the provider system 140, etc.) via the communications interface 202.

The processor 254 may be configured to obtain input data, analyze the input data, and/or generate output data to be communicated to other components of the document analysis system 110. In some embodiments, the processor 254 may obtain the input data, analyze the input data, and/or generate the output data to be communicated to other components of the document analysis system 110 using the machine learning model 112. For instance, the processor 254 (e.g., the machine learning model 112) may be a text extraction model configured to obtain (e.g., receive, request, pull, etc.) a text file from the media extractor 250, analyze the text file, and/or generate a plurality of text portions from extracted text.

The embedding model 256 may be configured to obtain input data, analyze the input data, and/or generate output data to be communicated to other components of the document analysis system 110. The embedding model 256 may obtain the input data, analyze the input data, and/or generate the output data to be communicated to other components of the document analysis system 110 using the machine learning model 112. For example, the embedding model 256 (e.g., the machine learning model 112) may be configured to obtain (e.g., receive, request, pull, etc.) the plurality of text portions from the processor 254, analyze the plurality of text portions, and generate a plurality of embeddings for the plurality of text portions.

The dataset generator 258 may be configured to obtain input data, analyze the input data, and/or generate output data to be communicated to other components of the document analysis system 110. The dataset generator 258 may obtain the input data, analyze the input data, and/or generate the output data to be communicated to other components of the document analysis system 110 using the machine learning model 112. For example, the dataset generator 258 (e.g., the machine learning model 112) may be configured to obtain (e.g., receive, request, pull, etc.) the plurality of text portions from the processor 254, the plurality of embeddings from the embedding model 256, and the metadata associated with the documents received by the media extractor 250, and generate a dataset (e.g., the dataset generated at block 330, as described below with reference to FIGS. 3A and 3B) including the plurality of text portions, the plurality of embeddings, and at least a portion of the metadata. In some instances, the generated dataset is configured to be queried to provide contextual data regarding the document (e.g., the document retrieved by the processing circuit 204 from a publicly available database) from the plurality of text portions. That is, the dataset may be communicated by the dataset generator 258 to the database 253 such that the database 253 may use the plurality of text portions, the plurality of embeddings, and the at least a portion of the metadata to respond to a query related to the dataset. As shown in FIG. 2, the database 253 may therefore be configured to communicate response data (e.g., data/information responsive to the query related to the dataset) to another system/device in the computing system 100 (e.g., the user device 120, the provider system 140, etc.).

Exemplary Computer-Implemented Process

Figure 3A:
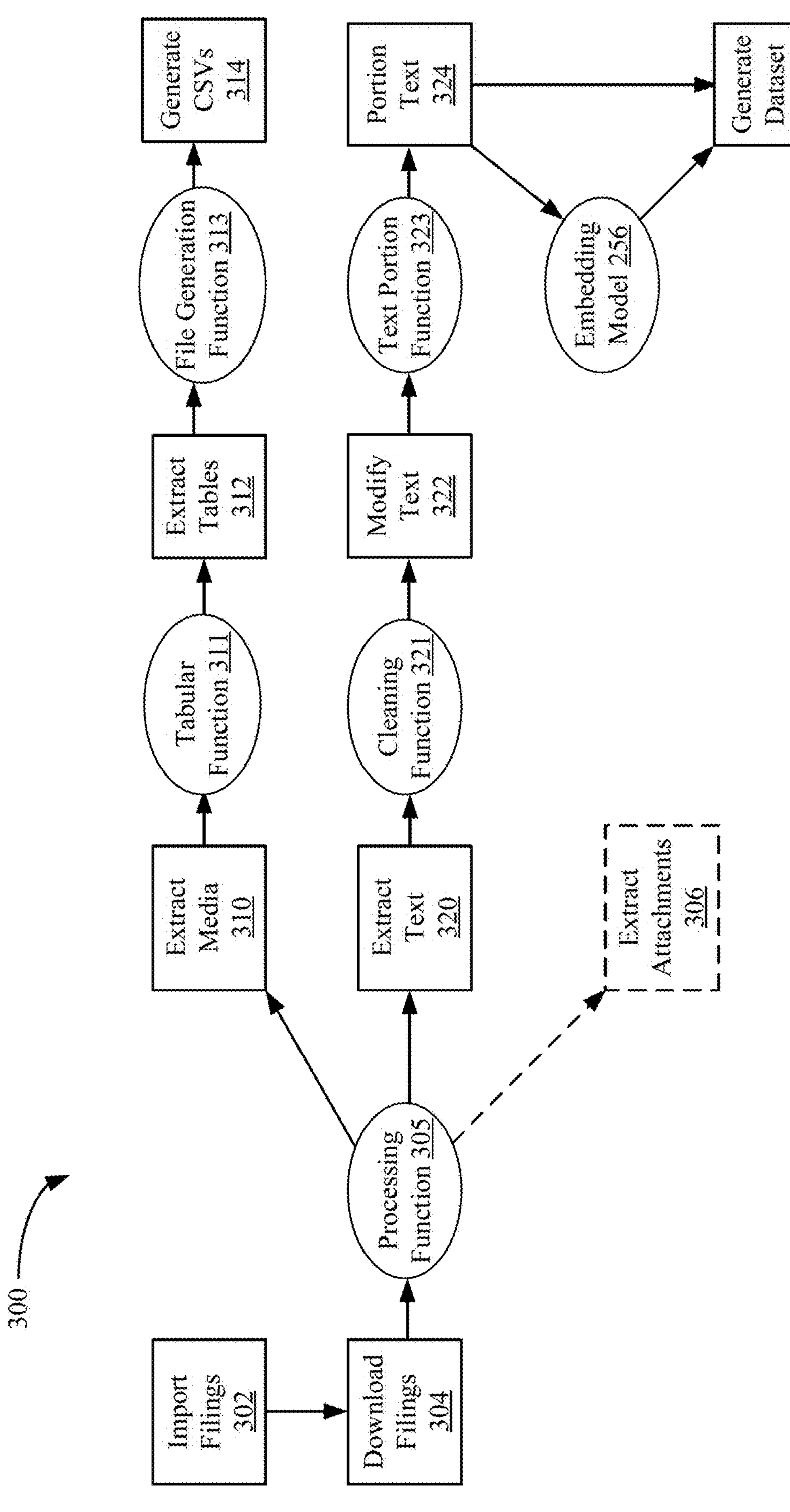
FIG. 3A is a flow diagram of an exemplary computer-implemented or computer-based process for building a model configured to analyze documents, according to some embodiments.
Figure 3B:
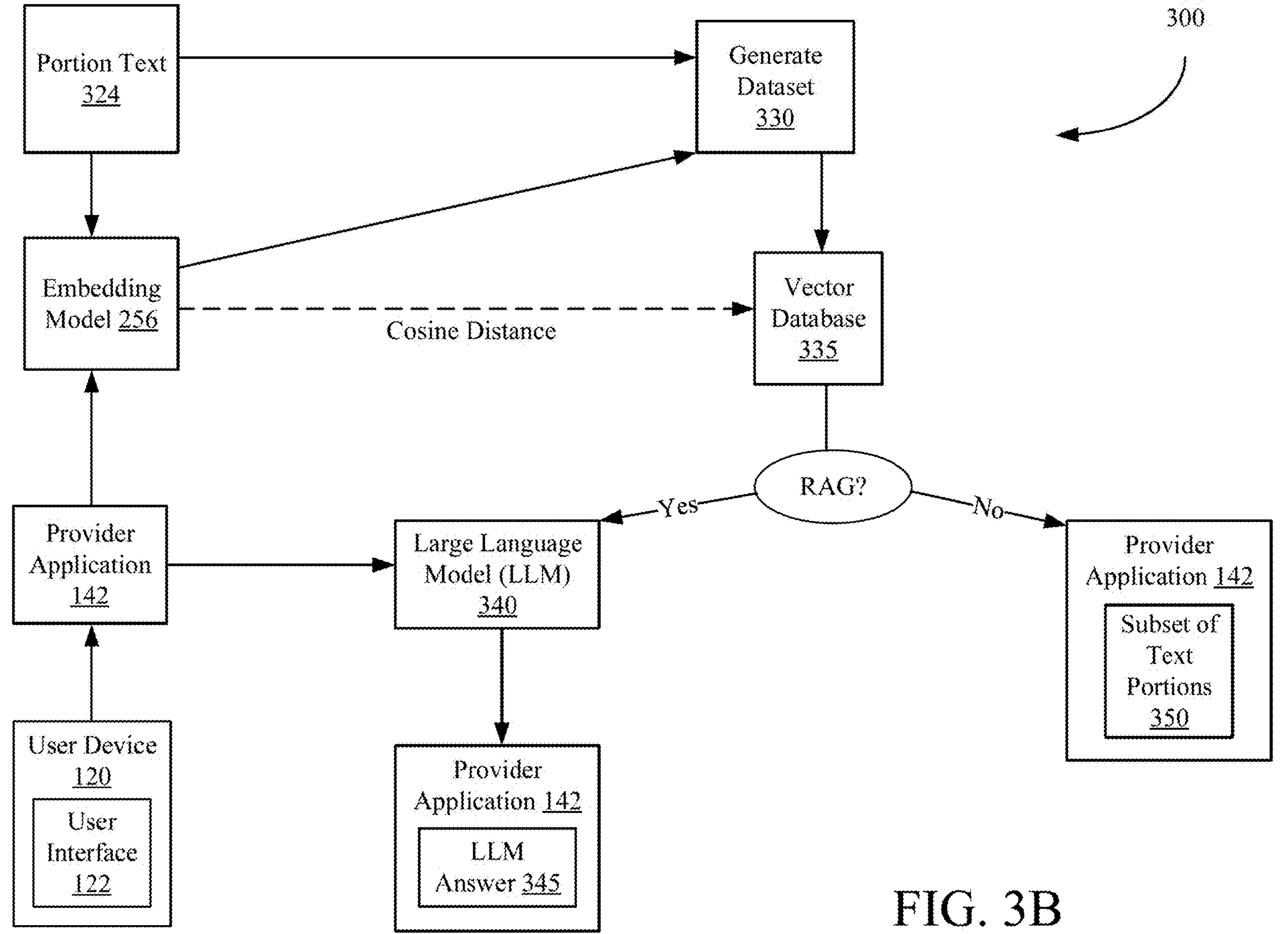
FIG. 3B is a flow diagram of a continuation of the process of FIG. 3A, according to some embodiments.

Referring now to FIGS. 3A and 3B, a flow diagram of an exemplary computer-implemented or computer-based process 300 for building a model configured to analyze documents is shown, according to some embodiments. The process 300 described in FIGS. 3A and 3B may refer to a process of building the machine learning model 112 used in the document analysis system 110, as described herein. For instance, the process 300 described in FIG. 3 may refer to a process of building an embedding model used to process insurance-related documents.

Computer-implemented process 300 begins by importing filings at block 302. The imported filings may refer to publicly available documents (e.g., insurance product filings) retrieved from a publicly available database. In the example of importing insurance product filings, the filings may relate to passenger information, non-tenant homeowners, commercial automotives, commercial peril, and so on. In various embodiments, an analyst (e.g., an analyst employed by an entity associated with the provider system 140) may identify the filings to be imported. Additionally or alternatively, the filings may be imported by a third-party software/vendor configured to automatically import relevant filings. The filings may be received in a plurality of formats (e.g., a PDF, an Excel sheet, etc.).

In certain embodiments, the imported filings may be imported based upon having a filing date within a specific timeframe (e.g., within the past year, within the past three years, within the past five years, etc.). Furthermore, in various embodiments, the imported documents may be filtered according to a particular geographic scope (e.g., the United States of America), such that only documents corresponding to the particular geographic scope are imported from the database. In the example of importing insurance filings from the United States of America, the documents may be further filtered to include filings from the top ten carriers by written premium in each state. In this way, documents with minimal relevance to an analyst may be filtered out from the database such that only documents with a relevance to the analyst are imported.

Continuing with the example of insurance filings, the filings that are of interest to an insurance analyst may include rates, rules, and forms associated with one or more entities (e.g., third-party protective service providers) of interest. The rate filings of a particular entity or group of entities, for example, may provide the insurance analyst with insight regarding market conditions (e.g., demand for insurance, etc.). As another example, the rules filings may be relevant to an insurance analyst who intends to modify the language used to describe a type of coverage. As yet another example, the form filings may be relevant to an insurance analyst that intends to modify a form signed by a customer. In general, the filings may provide insight to the insurance analyst such that product offerings of a protective service provider (e.g., associated with the provider system 140) may be updated to align with current trends identified from among the filings and such that the protective service provider may enhance the relevant and effectiveness of the product offerings. Although regulatory filings are described with respect to the present disclosure, it should be appreciated that the processes described herein may apply to different filings and/or a plurality of different types of filings. In various embodiments, the filings may include news reports, press releases, social media posts, and any other type of publication.

Once the filings are imported at block 302, the imported filings may be downloaded at block 304. In some instances, the imported filings may be downloaded onto a browser or other application such that the imported filings are accessible by the machine learning model 112. In certain embodiments, the filings may be downloaded according to a particular format (e.g., a PDF). In some implementations, the filings may be downloaded by a third-party software used to determine the frequency with which the filings are downloaded. For instance, the third-party software may implement a rule that automates downloading filings daily (e.g., daily at 7:00 AM), weekly (e.g., every Monday), monthly, and so on.

In some implementations, the analyst and/or the provider system 140 may designate one or more tracked entities that are relevant to the analyst and/or the provider system 140. For instance, the one or more tracked entities may include one or more competitors of the entity associated with the provider system 140. The one or more competitors may operate in similar and/or same lines of business, geographical regions, and so on. In this instance, the imported filings from block 302 may be filtered according to the one or more tracked entities such that only filings associated with the one or more tracked entities are downloaded. In some implementations, the analyst and/or a provider entity associated with the provider system 140 may be notified when a competitor submits a filing to a publicly available database. In such implementations, the analyst and/or the provider entity may indicate a preference to either automatically import and download the competitor filing and/or may take an action to import and download the competitor filing in response to receiving a notification regarding the competitor filing.

Competitor filings may be an indication of claim trends, market trends, customer desires, etc. Competitor filings may provide insights with market trends and customer needs, as well as reducing insurance claims and reducing damage to insured assets, such as by identifying faulty construction materials or parts. The insights may facilitate providing new or modified insurance products; reducing insurance claims and damage to customer assets; better matching price to risk; providing better customer service; and/or increasing customer satisfaction.

Once the filings are downloaded, machine learning (e.g., the machine learning model 112) may be used to process the documents. That is, the downloaded filings from block 304 may pass through a processing function 305. As shown in FIG. 3A, the processing function 305 may be configured to perform operations including, in certain instances, extracting attachments at block 306, extracting media at block 310, and extracting text at block 320. Processing the documents in this way allows for identification and extraction of information in a variety of formats from within the filings (e.g., tabular information, graphical information, image information, etc.). The information may be stored in a database (e.g., database 253, as described above with reference to FIG. 2) and, in some implementations, may be processed by an embedding model (e.g., the embedding model 256) such that the information in these formats may be included in a query response and/or compatible with natural language processing.

In instances where the downloaded filings include attachments (e.g., links, auxiliary documents, and so on) associated therewith, the processing function 305 may be used to extract the attachments at block 306. In some embodiments, the attachments may be extracted by the media extractor 250, as described above with reference to FIG. 2. In certain instances, the media extractor 250 may extract and store the attached files in the database 253 such that the information included in the attached files may be provided to a user in response to a query. For instance, the attachments may include additional documents/publications that may of interest to a user receiving the filing from which the attachments are extracted as a query response.

In some embodiments, the media extractor 250, as described above, is used to extract the media (e.g., images, charts, tables, graphs, etc.) from the documents at block 310. The media extractor 250 may generate media files (e.g., PNG files) containing the extracted media from the documents. From the media files extracted at block 310, a tabular function 311 may be used to extract tables at block 312. With insurance filings, for instance, documents contain large amounts of information in a tabular format, and the tables may be analyzed separately from the rest of the text included in the document. In some embodiments, the tabular function 311 may be configured to extract the tables at block 312 as PNG files using image extraction. That is, the media included in the document may be photographed and analyzed using a computer-vision model (e.g., the analyzer 252). In this instance, the tabular function 311 may include the functionality of the computer-vision model.

According to certain embodiments, the computer-vision model may include an off-the-shelf foundation model. Additionally or alternatively, the off-the-shelf foundation model may be fine-tuned to a particular domain (e.g., the insurance industry). Fine-tuning may include labeling pieces of data as the data is processed by the model to retrain the off-the-shelf model over time. In certain embodiments, the computer vision model may be further configured to identify trends within the photographed media and may allow for question-and-answer semantics.

In some embodiments, the tables extracted at block 312 by the tabular function 311 may pass through a file generation function 313. The file generation function 313 may be used to generate a comma-separated value (e.g., a CSV) file at block 314 from the tables extracted at block 312. That is, the extracted tables include data that is then replicated in a CSV file at block 314 such that the data is compatible with a plurality of processing systems and may be used to perform a plurality of analyses. For instance, the CSV files may be stored (e.g., in the database 253) and retrieved to respond to a user query. In certain embodiments, the CSV files may be used for additional analyses such as further table processing, table question answering, chart creation, etc.

In addition to extracting media at block 312, processing the downloaded filings using the processing function 305 further includes extracting text at block 320. That is, the text from the filing may be extracted and saved as a text file (e.g., .TXT file). From the downloaded filing, the extracted text may first be saved as a "messy" text file at block 320. The "messy" text file refers to a text file including unmodified/original/raw text extracted directly from the downloaded filing. In some embodiment, the text file may include metadata related to the document associated therewith (e.g., a unique document identifier, a date of last modification to the document, a date of submission of the document, an entity responsible for submitting the document, a subgroup to which the entity responsible for submitting the document belongs, and so on.). In some instances, the metadata may be imported with the document at block 302 and similarly may be downloaded at block 304.

From block 320, the "messy" text file may pass through a cleaning function 321. The cleaning function 321 may be configured to apply a plurality of modification rules at block 322 such that a modified text file (e.g., a "clean" text file) is generated. For instance, the modification rules may be configured to remove lines, remove non-English characters, remove duplicate text, and so on. In certain embodiments, the cleaning function 321 may use generic modification rules (e.g., imported from an off-the-shelf machine learning model). Additionally or alternatively, a user (e.g., an analyst, an entity associated with the provider system 140, etc.) may create additional modification rules for modifying the "messy" text file. For example, an additional modification rule may include a rule to remove tables from a PDF once images of the tables are extracted (e.g., because the presence of the table may interfere with the text extraction). The additional modification rules may, in some instances, be based upon a particular domain to which the filing relates (e.g., the insurance industry).

The modified text file may retain the metadata associated with the "messy" text file, such that the metadata remains with the modified version of the extracted text. In this way, a user may submit a query that includes a search parameter related to the metadata (e.g., as described below with reference to filter elements 705). For instance, the user may submit a query including a search parameter that specifies an entity responsible for submitting the filing. As another example, the metadata (e.g., the entity responsible for submitting the filing, a group of filings with which the filing is associated, a date of filing, etc.) may be used to combine filings (e.g., using the toggle 720) within a set of search results (e.g., array of results 805, aggregated array of search results 815) according to the metadata.

In certain implementations, various analyses may be performed using the modified text file such as key word extraction, named entity extraction, and summary creation. The named entity extraction may identify, for instance, that "State Farm" is an insurance company, "Karen" is a woman, "Kia" is a car manufacturer, and so on. In some embodiments, an analyst and/or an entity associated with the provider system 140 may designate a preference to receive an alert when there is a particular key word and/or named entity identified from the modified text file. With the alert, the analyst may automatically receive notice of the key word and/or named entity as soon as the text file is modified, rather than manually searching each modified text file for the key word and/or the named entity.

From block 322, the modified text file may pass through a text portion function 323 that may be used to generate text portions (e.g., "chunks" of text) at block 324. Each of the text portions generated by the text portion function 323 may also include the metadata from the downloaded filings associated therewith. The text portions refer to digestible pieces of the modified text such that the most relevant text is identified from the modified text file and such that the modified text file may be compatible with various model limitations. For instance, models may have a limit for the number of word pieces that the model is configured to ingest (e.g., 512 words). Therefore, the generated text portions recite paragraph-level information and are configured to comply with a limited number of word pieces ingestible by a model. In the example where the limit for the number of word pieces is 512 words, the text (e.g., from the modified text file generated at block 322) may be portioned into 512-word pieces using an off-the-shelf software.

As shown in FIG. 3A, each text portion is sent to an embedding model (e.g., an off-the-shelf sentence transformer, embedding model 256, etc.) such that by the completion of process 300, the downloaded filings (e.g., PDFs) are embedded with a transformer model so that the filings may be semantically understandable (e.g., may be queried against by a user). Process 300 concludes by generating a dataset at block 330, the dataset including the text portions generated at block 324, the embeddings corresponding to each of the text portions received from the embedding model, and the metadata associated with the filings from which the text portions are extracted.

Referring now to FIG. 3B, a continuation of the process 300 is shown, according to some embodiments. FIG. 3B includes the embedding model 256 receiving the text portions from block 324 and embedding the text portions with a plurality of embeddings. From the embedding model 256, FIG. 3B shows the text portions and the corresponding plurality of embeddings being combined with the metadata associated with the text portions to generate the dataset at block 330. The embedding model 256 embeds the text portions with semantic information and stores the embeddings in a vector database 335. That is, in some embodiments, the semantic information may be stored in the vector database 335 in a numerical form with the text portions and the metadata from the dataset. Once the information from the dataset is stored in the vector database 335, the information may be available for an analyst to query.

As shown in FIG. 3B, the process 300 shows the user device 120 including the user interface 122. The user device 120 may be used by an analyst (e.g., an employee of an entity associated with the provider system 140) to access the provider application 142. As described herein, the provider application 142 may allow the analyst to access the document analysis system 110 described herein. In some implementations, the analyst may submit a query via the user interface 122 of the user device 120 (e.g., as described below with reference to FIGS. 7A-7D). The query may relate to any of the downloaded documents.

During process 300, the provider application 142 may receive the query from the user device 120 and may send the query to the embedding model 256. The embedding model 256 may be configured to embed the query in a same and/or similar manner with which the embedding model 256 embeds the text portions. In this way, the embedded query may be compared against the embedded text portions stored in the vector database 335 such that relevant data with respect to the query is identified from the dataset. Therefore, a subset of the text portions and metadata associated therewith may be retrieved from the dataset based upon the comparison of the embedded query to the data stored within the vector database 335 and may be provided to the analyst as a response to the query. In various embodiments, the filings from which the subset of the text portions are extracted may be identified and also provided to the analyst in the response to the query.

In various embodiments, the response to the query may be generated based upon whether retrieval-augmented generation (RAG) is used in providing the response. RAG refers a capability that allows for natural language querying. For instance, as shown in FIG. 3B, where RAG is used to provide the response to the analyst, RAG forwards the subset of the text portions identified from the vector database 335 to a large language model (LLM) 340. The LLM 340 may be trained to provide the response as an LLM answer 345 to the query based upon a context provided by the query. Where RAG is not used to provide the response, however, the subset of the text portions may be provided directly as the response to the query, as shown in FIG. 3B by block 350. The LLM answer 345 and the subset of text portions from block 350 may be provided as the response to a query via the provider application 142. In this way, an analyst accessing the provider application 142 from the user device 120 may receive the response to the query via the user interface 122 (e.g., as shown in FIGS. 8A-8D).

Exemplary Computer-Implemented Method for User Engagement

Figure 4:
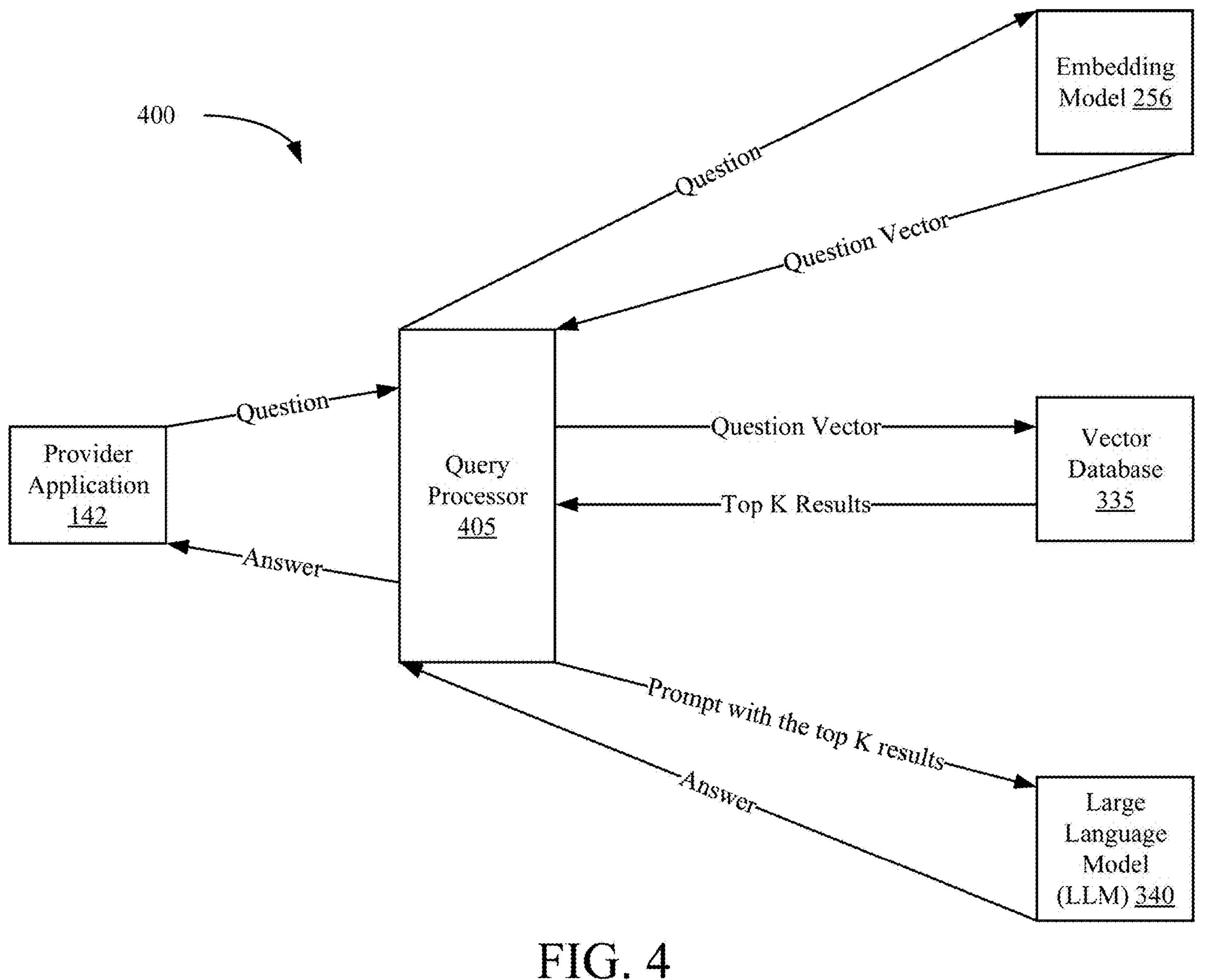
FIG. 4 is a flow diagram of an exemplary computer-implemented or computer-based process for a user engagement with the model built by the process of FIGS. 3A and 3B, according to some embodiments.

FIG. 4 is a block diagram of an exemplary computer-implemented or computer-based process 400 for a user engagement with the model built by the process of FIGS. 3A and 3B, according to some embodiments. As shown in FIG. 4, the process 400 begins when the provider application 142 receives a query (e.g., a question) from a user (e.g., an analyst accessing the provider application 142 via the user device 120). The query may be sent to a query processor 405. After the query processor 405 receives the question, the query processor 405 may be configured to send the question to the embedding model 256, which embeds the question using a vectorization of the text included in the question.

As shown, the embedding model 256 sends the question vector, via the query processor 405, to the vector database 335, where the question vector is compared against the embeddings corresponding to the text portions, as described above. Based upon the comparison between the question vector and the embedded text portions, top-K results may be identified from the vector database 335. Where the response uses RAG, the top-k results may be provided as a prompt to the LLM 340, which generates an answer (e.g., the LLM answer 345) based upon context provided by the question. As shown in FIG. 4, the answer from the LLM 340 may be provided to the provider application 142 such that the analyst who submits the question via the provider application 142 (e.g., accessed by the user device 120) may receive the answer via the user device 120.

It should be understood that, in various implementations, the various functions described herein (e.g., the processing function 305, the tabular function 311, the file generation function 313, the cleaning function 321, the text portion function 323, etc.) may be implemented in one or more of a variety of ways. For example, one or more of the functions may be Python functions or functions implemented in any other language. The functions may be or include open source or preexisting functions that perform the indicated functionality or may be functions specifically designed for the present systems and methods described herein. In various implementations, the functions may be artificial intelligence and/or machine learning-implemented functions (e.g., AI and/or ML models, including, but not limited to generative AI models) and/or may be functions/algorithms not utilizing AI/ML, such as rule-based functions/algorithms. All such implementations are contemplated within the scope of the present disclosure.

Exemplary Document Analysis System & Functionality

Figure 5:
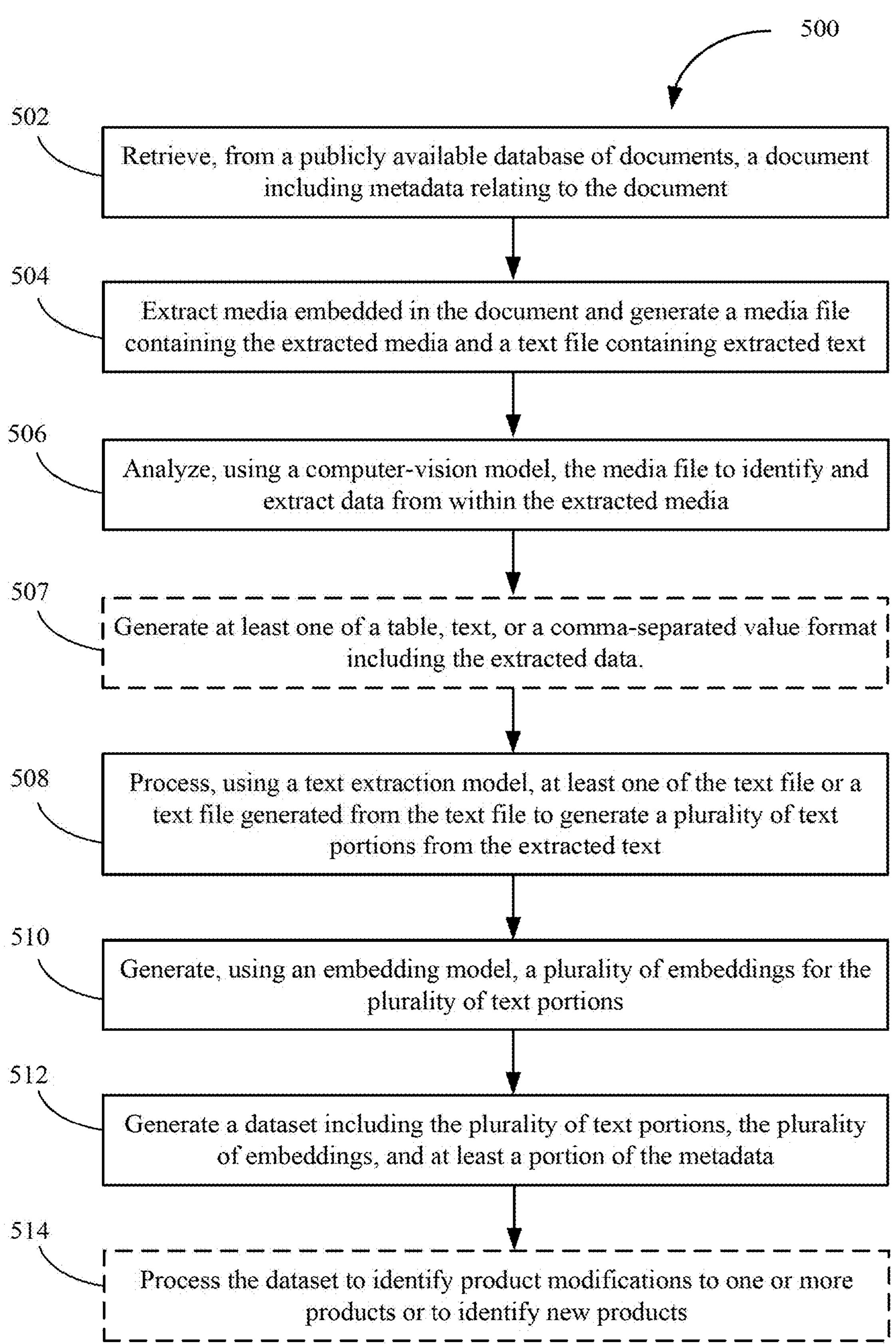
FIG. 5 is a flow diagram of an exemplary computer-implemented or computer-based process for analyzing documents using the model built by the process of FIGS. 3A and 3B, according to some embodiments.

Referring now to FIG. 5, a computer-implemented or computer-based process, shown as process 500, for analyzing documents is shown, according to some embodiments. Computer-implemented process 500 may be implemented by any and/or all the components of the computing system 100 of FIGS. 1-2 (e.g., the document analysis system 110, etc.). It should be appreciated that any and/or all the process 500 may be implemented by other systems, devices, and/or components (e.g., components of the computing system 100, the document analysis system 110, the machine learning model 112, etc.). Further, it should be appreciated that process 500 may be implemented using additional, different, and/or fewer operations, actions, and/or functionality.

Computer-implemented process 500 may include retrieving, from a publicly available database of documents, a document (block 502), according to some embodiments. In some embodiments, the publicly available database of documents may be accessible via at least one of the storage system 150 (e.g., the database 152), the third-party system 130, etc. The publicly available database may include a plurality of documents. For instance, the plurality of documents may include various insurance filings. In this example, the document retrieved at block 502 may be one or more insurance-related filings. According to certain implementations, the retrieved document may be associated with a competitor entity of the entity associated with the provider system 140.

Computer-implemented process 500 may include extracting media embedded in the document and generating a media file containing the extracted media and a text file containing extracted text (block 504), according to some embodiments. The media may be extracted by the media extractor 250, as described above with reference to FIG. 2.

In some instances, the media extracted from the document at block 504 may include images, hyperlinks, attachments, tables, graphs, etc.

After extracting the media from the document, the remaining text may be converted to a text file. In some embodiments, the remaining text may be initially in a format incompatible with natural language processing (NLP). That is, the remaining text (e.g., "messy text") may be in a format that is unable to be searched/queried. For instance, if a user submits a natural language search query, information in a messy text format may not be presented in the results due to the text's incompatibility with NLP. Therefore, in various implementations, a machine learning model (e.g., machine learning model 112) may be used to convert the text file from a messy text version to a clean/modified text version. The clean text version refers to a version of the text file that may be searched using NLP and that removes extraneous text (e.g., text related to the extracted media, duplicate text, non-English characters, etc.).

Computer-implemented process 500 may include analyzing the media file to identify and extract data from within the extracted media (block 506), according to some embodiments. As described above with reference to FIG. 2, after the media extractor 250 extracts the media, the media file may be stored in a database (e.g., database 253) such that the media files may be provided to a user in response to a search query. Computer-implemented process 500 may further include generating at least one of a table, text, or a comma-separated value format including the extracted data (block 507), according to some embodiments. The table, text, or comma-separated value format including the extracted data may be presented to a user in response to a search query (e.g., via user interface 800, as described below with reference to FIGS. 8A-8D).

Computer-implemented process 500 may include processing at least one of the text file or a text file generated from the text file to generate a plurality of text portions from the extracted text (block 508), according to some embodiments. In various embodiments, the plurality of text portions may be generated by the processor 254 (e.g., a text extraction model), as described above with reference to FIG. 2. Computer-implemented process 500 may include generating a plurality of embeddings for the plurality of text portions (block 510), according to some embodiments. The plurality of embeddings may be generated by the embedding model 256, as described above.

Computer-implemented process 500 may include generating a dataset including the plurality of text portions, the plurality of embeddings, and at least a portion of the metadata (block 512), according to some embodiments. That is, in some embodiments, the dataset generator 258 may receive the plurality of embeddings and the plurality of text portions from the processor 254 and the embedding model 256. As described above, the dataset generator 258 may store the dataset in the database 253 such that information included in the dataset may be provided as response data in response to a search query.

In various embodiments, computer-implemented process 500 may optionally include processing the dataset to identify one or more product modifications to one or more products or to identify one or more new products based on information from the dataset (block 514). That is, the one or more product modifications may include an update to a protection product (e.g., homeowner's policies, automotive or vehicle policies, health policies, life policies, renters' policies, personal articles or personal belongings policies, umbrella policies, parametric policies, various endorsements, etc.) offered by the protective services entity associated with the provider system 140. For example, the updating the protection product may include providing new coverage options, revising underwriting criteria, updating advertisements, and so on. In some embodiments, the protection product may include insurance products, extended warranties, service contracts, mitigation services, or any other related offerings. In this way, the dataset generated at block 512 of computer-implemented process 500 provides insight regarding how the protective services entity may update product offerings (e.g., protection parameters) to align with current trends in the protective services industry and enhance the relevance and effectiveness of protection products.

Exemplary Computer-Based Process for Responding To Queries

Figure 6:
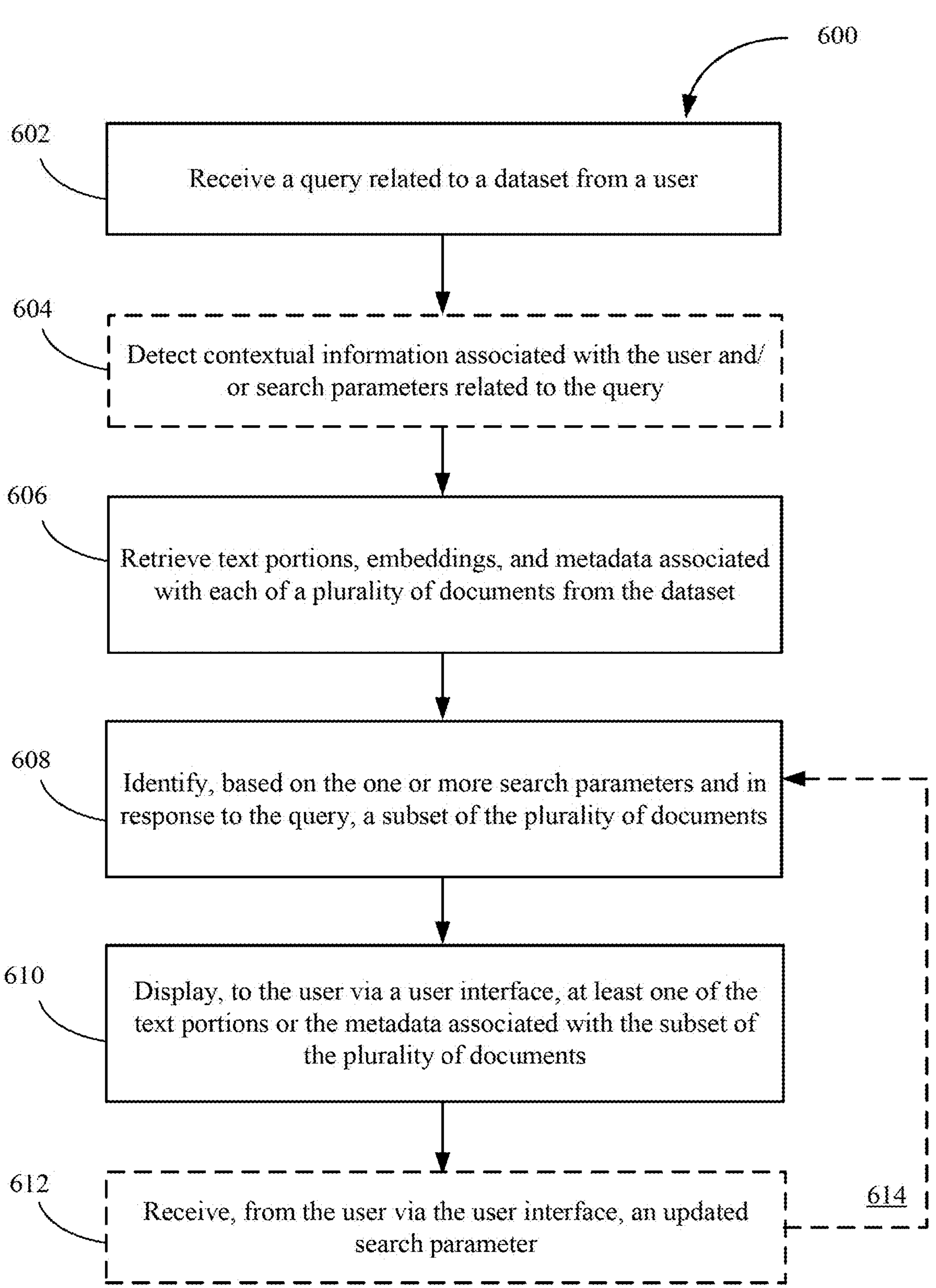
FIG. 6 is a flow diagram of an exemplary computer-implemented or computer-based process for responding to a query related to the document analysis performed during the process of FIG. 5, according to some embodiments.
Figure 7A:
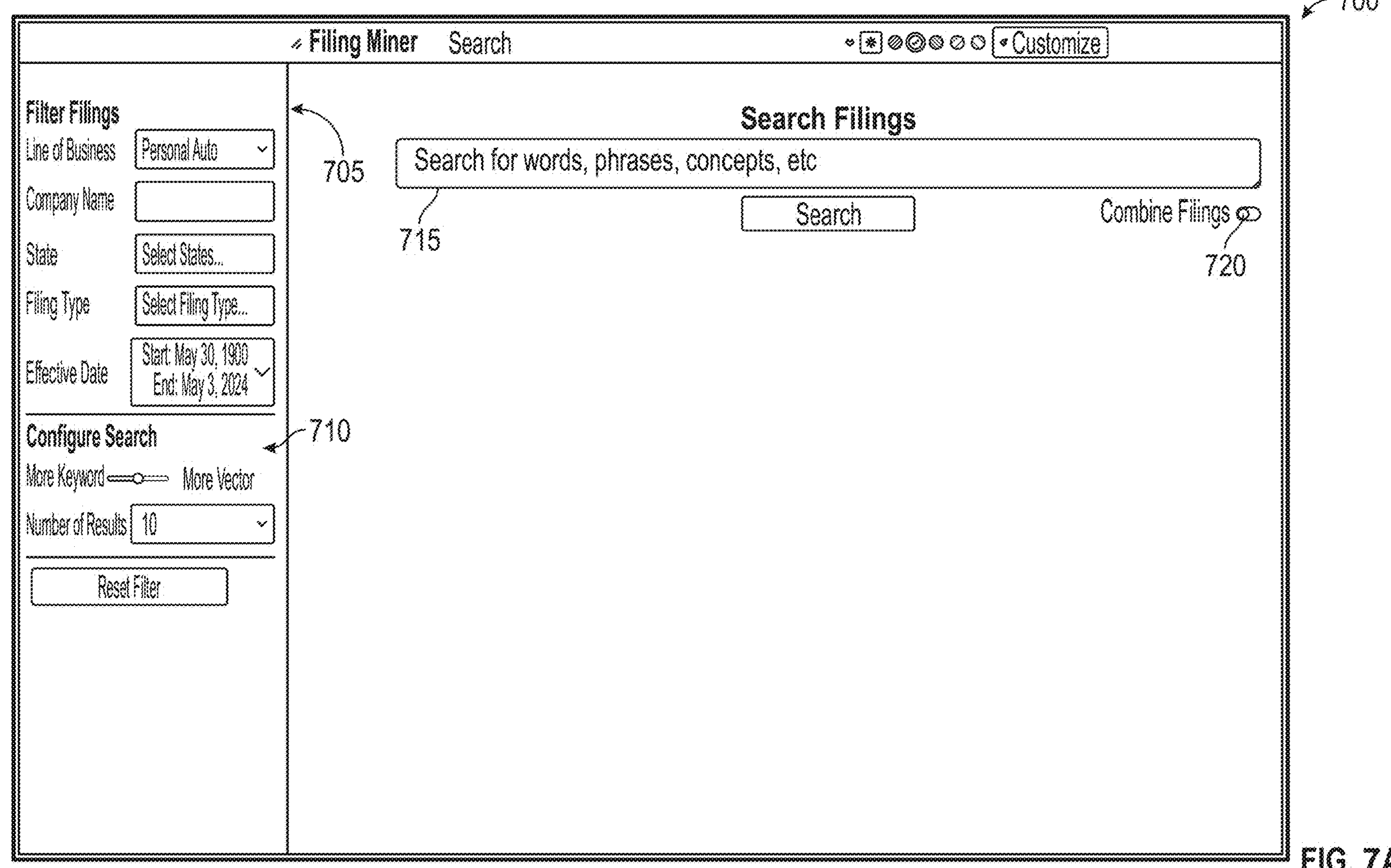
FIGS. 7A-7D are depictions of an exemplary user interface including a search field for querying documents, according to some embodiments.
Figure 7B:
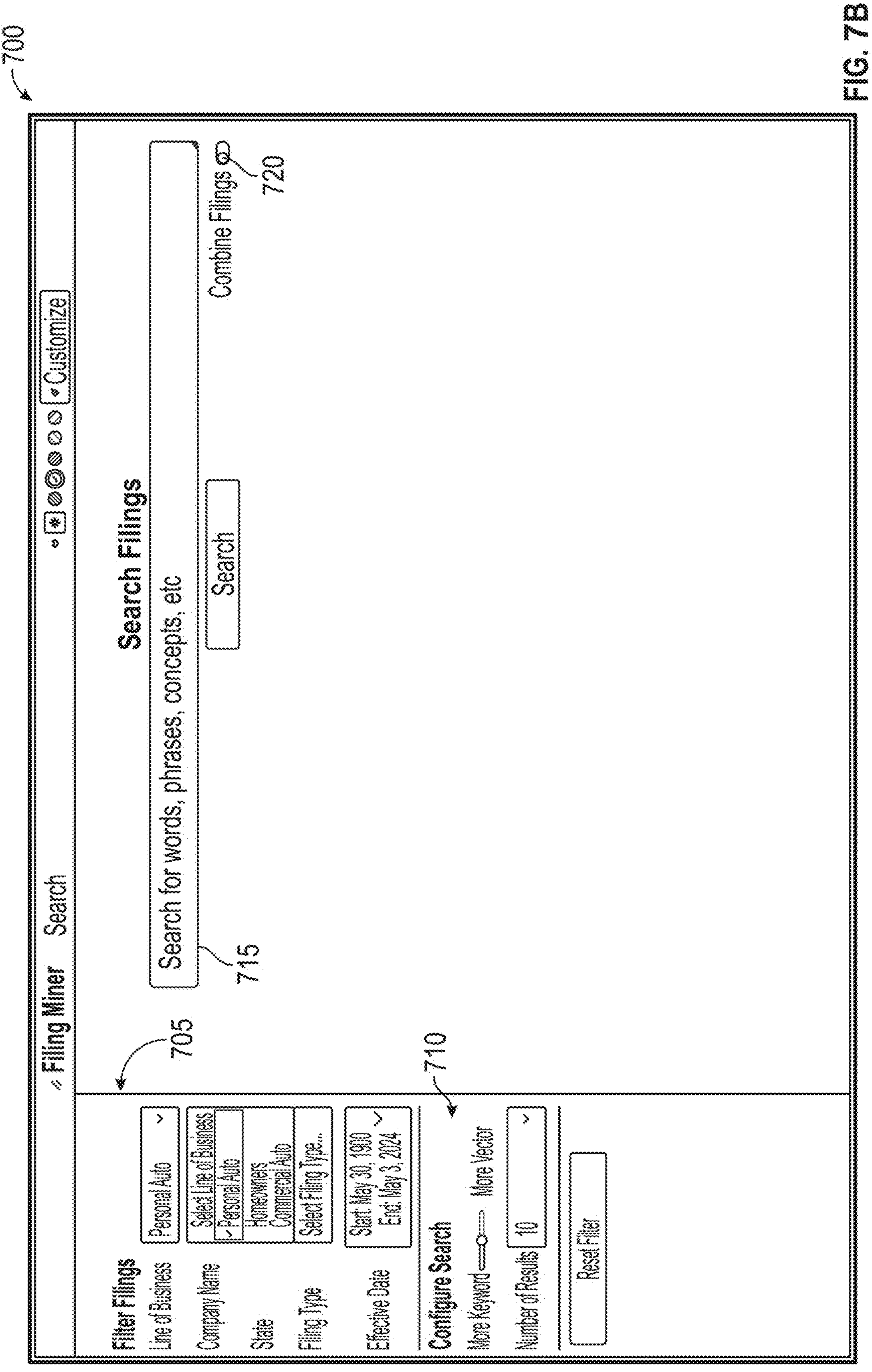
Figure 7C:
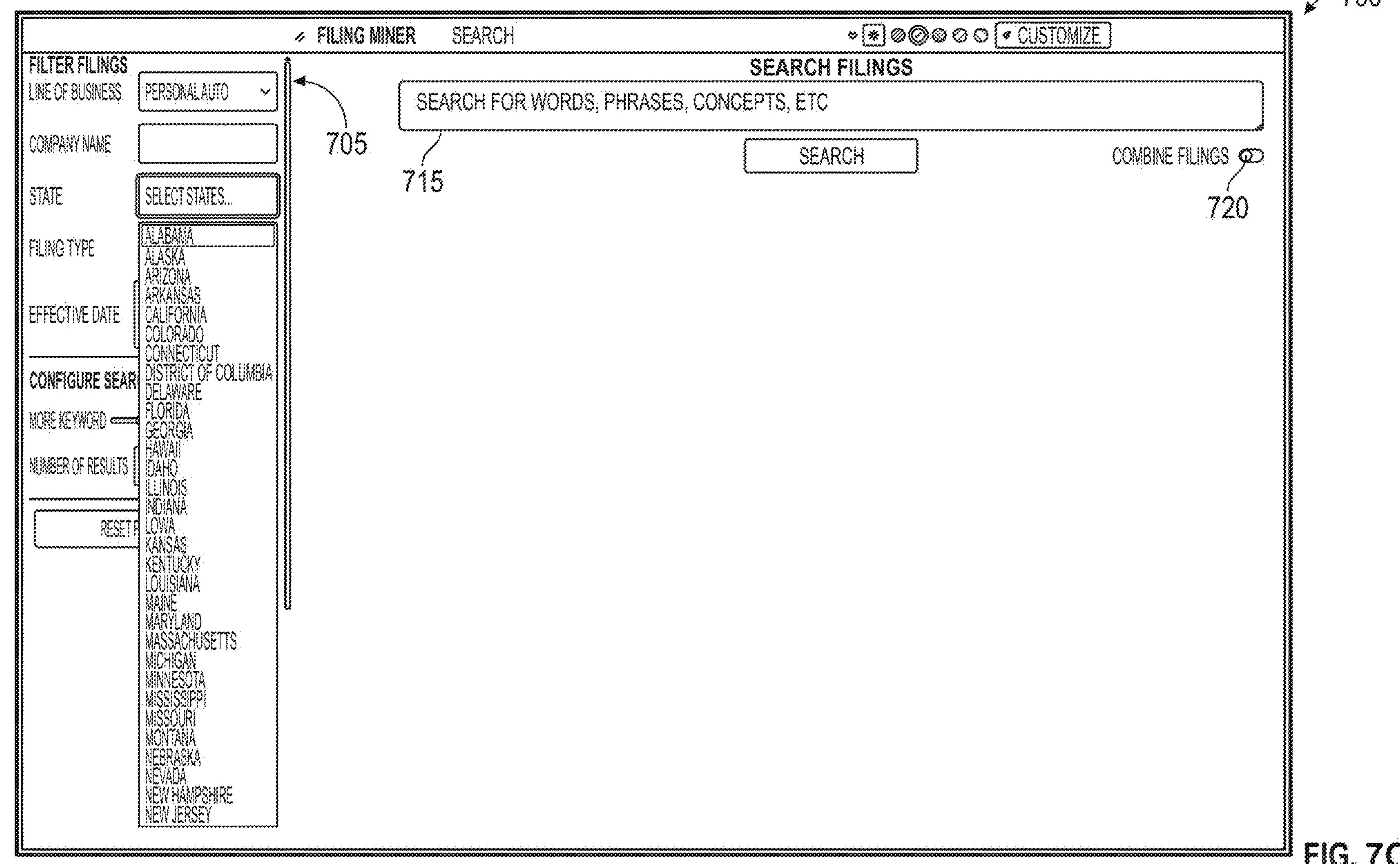
Figure 7D:
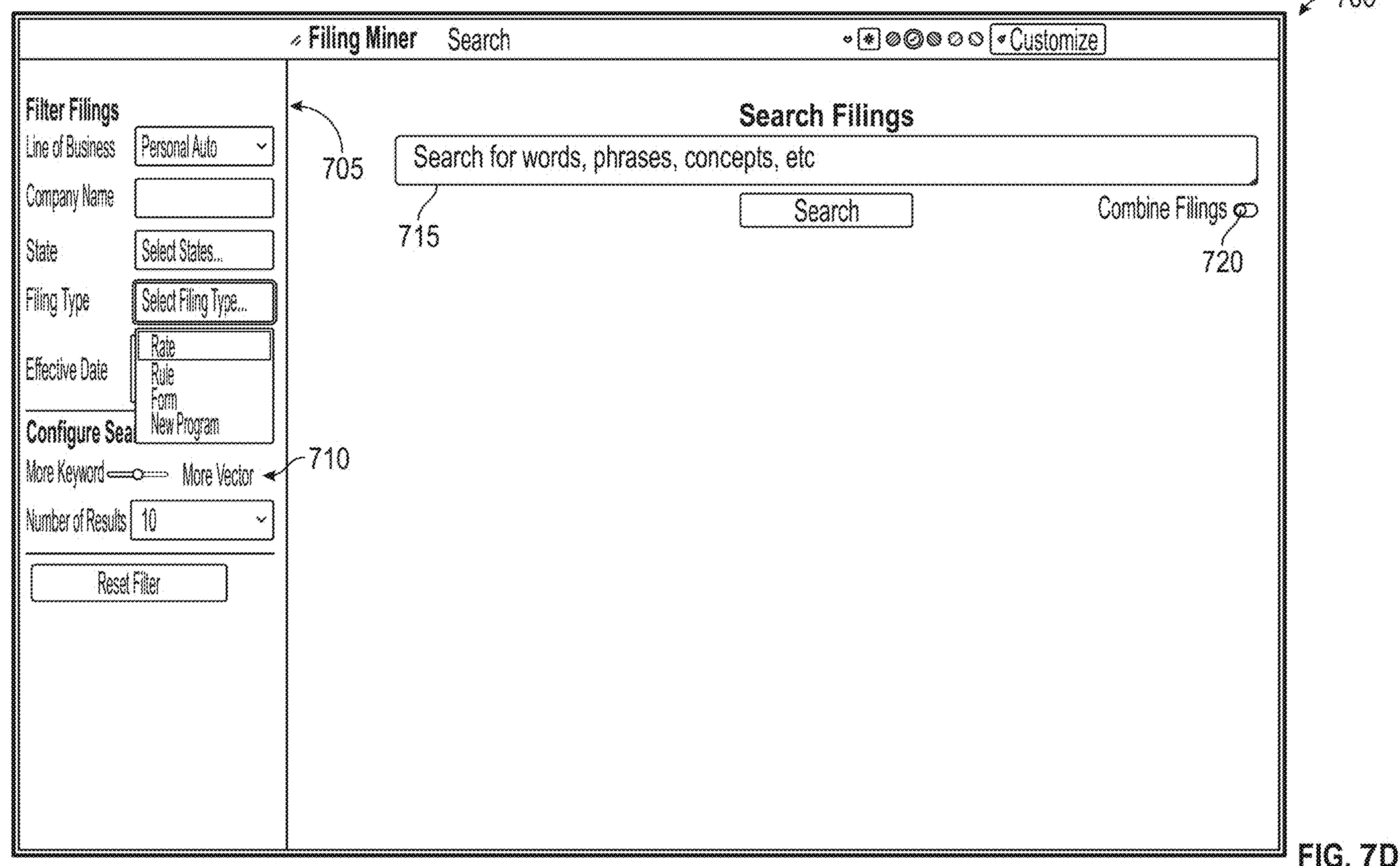

Referring now to FIG. 6, a computer-implemented or computer-based process, shown as process 600 for responding to a query related to the document analysis performed during the process of FIG. 5 is shown, according to some embodiments. Process 600 may be implemented by any and/or all the components of the computing system 100 of FIGS. 1-2 (e.g., the document analysis system 110, etc.). It should be appreciated that any and/or all the process 600 may be implemented by other systems, devices, and/or components (e.g., components of the computing system 100, the document analysis system 110, the machine learning model 112, etc.). It should be appreciated that process 600 may be implemented using additional, different, and/or fewer operations, actions, and/or functionality.

Computer-implemented process 600 may include receiving a query related to a dataset from a user (block 602), according to some embodiments. The query may be received via the user interface 700, as described below. In certain instances, the query may relate to a request for insurance-related information/data. More specifically, the query may include a request for a document associated with a competitor of a provider institution (e.g., a provider institution associated with the provider system 140).

Computer-implemented process 600 may include detecting contextual information associated with the user and/or search parameters related to the query (block 604), according to some embodiments. The contextual information may refer to user information associated with the user responsible for submitting the query received at block 602. In some instances, the user information may include a role, a geographical location, a line of business, and so on, corresponding to a user's position within a provider institution. That is, the document analysis system 110 may identify the user as an employee of the provider institution associated with the provider system 140 and may determine results to the query based upon the position of the user and a relevance of the results with respect to the position. The search parameters refer to user-defined instructions for the document analysis system 110 to filter results to the query received at block 602. In some embodiments, the user may indicate the search parameters when submitting a query via a user interface (e.g., user interface 700). For example, the search parameters may include any of the filter elements 705 or the result configurations 710, as described below with reference to FIGS. 7A-7D.

Computer-implemented process 600 may include retrieving the plurality of text portions, the plurality of embeddings, and the at least a portion of the metadata associated with each of a plurality of documents from the dataset (block 606), according to some embodiments. The plurality of text portions and the plurality of embeddings may be retrieved from the database 253, as described above with reference to FIG. 2. The metadata may be stored in the database 253 with the plurality of text portions and the plurality of embeddings as part of the dataset generated by the dataset generator 258.

Computer-implemented process 600 may include identifying, based upon the one or more search parameters and in response to the query, a subset of the plurality of documents (block 608), according to some embodiments. The subset of the plurality of documents may be identified based upon one or more similarities (e.g., keyword similarities, semantic similarities, etc.) between a search query and the plurality of text portions, the plurality of embeddings, and the metadata (e.g., the dataset stored in the database 253) retrieved at block 606.

Computer-implemented process 600 may include displaying, to the user via a user interface, at least one of the text portions or the metadata associated with the subset of the plurality of documents (block 610), according to some embodiments. In some embodiments, the at least one of the text portions or the metadata associated with the subset of the plurality of documents may be presented via user interface 800, as described below with reference to FIGS. 8A-8D.

Computer-implemented process 600 may include receiving, from the user via the user interface, an updated search parameter (block 612), according to some embodiments. The updated search parameter may include a change to a search parameter included in the initial query (e.g., detected at block 604) and/or an additional search parameter not previously included in the query. In certain embodiments, the user may submit the updated search parameter via the user interface 800, as described below with reference to FIGS. 8A-8D.

As shown by step 614, computer-implemented process 600 may include an iterative process following the receipt of the updated search parameter, according to some embodiments. That is, upon receiving the updated search parameter, computer-implemented process 600 may include a repetition of blocks 608 and 610 based upon the updated search parameter. For instance, step 614 may cause the document analysis system 110 to identify, based upon the updated search parameter and in response to the query, an updated subset of the plurality of documents. In some instances, the updated subset of the plurality of documents may include at least some of the same documents as the subset of the plurality of documents previously identified at block 608. Alternatively or additionally, the updated subset of the plurality of documents may include entirely different documents from the subset of the plurality of documents previously identified at block 608. In still other instances, the updated subset of the plurality of documents may include the same documents as the subset of the plurality of documents previously identified at block 608, but the updated subset of plurality of documents may be presented in an order that differs from that of the subset of the plurality of documents previously identified at block 608 (e.g., based upon the updated search parameter received at block 612).

User Interface Displaying Document Analysis Results

Referring now to FIGS. 7A-7D, a computer-generated user interface, shown as user interface 700, for displaying an input field for a search query is shown, according to some embodiments. User interface 700 may be generated by any and/or all the components of the computing system 100 of FIGS. 1-2 (e.g., the document analysis system 110, etc.). It should be appreciated that any and/or all the user interface 700 may be generated by other systems, devices, and/or components (e.g., components of the computing system 100, the document analysis system 110, the machine learning model 112, etc.). It should be appreciated that in some embodiments, user interface 700 may display additional, different, and/or fewer displays, options, icons, and/or functionality. In certain embodiments, the user interface 700 may be displayed via the user interface 122 of the user device 120.

User interface 700 is shown to include various customizable search parameters, such as filter elements 705 and result configurations 710. The filter elements 705 may be used (e.g., by a user of the user device 120, by an employee of the provider system 140, etc.) to narrow the results generated from a search query. For example, as shown in FIGS. 7A-7D, the filter elements 705 may include filters according to a line of business (e.g., personal auto, homeowners, commercial auto, personal articles, renters, life, health, etc.), a company name, a state, a filing type (e.g., rate, rule, form, new program, etc.), and/or an effective date (e.g., between May 30, 1900, and May 3, 2024, etc.).

The result configurations 710 enable a user of the user interface 700 to designate how the document analysis system 110 organizes/sorts the results of a search query. For instance, the result configurations 710 may include a slidable scale with which a user may engage in order to indication whether the user prefers to see results with a closest match according to a keyword or according to a sentiment (as indicated by a vector analysis). In such instances, a user may adjust the scale (e.g., by dragging an element along the depicted scale) to determine an amount of a keyword similarity versus an amount of a semantic similarity between the results and the search query. For example, the slidable element may represent a number from 0-1 that determines how much weight to apply to the keyword similarity versus the semantic similarity. The vector database (e.g., vector database 335, as described above) conducts two searches, one vector search (e.g., to identify semantic similarity) and one keyword search (e.g., to identify keyword similarity). Both searches are conducted simultaneously, and the results are then weighted based upon the location of the slidable element along the scale.

If the user slides the selectable element to the "More Keyword" side of the slidable scale, then the document analysis system 110 presents results based upon a nearest keyword match to one or more key words in the search query. Alternatively, if the user slides the selectable element to the "More Vector" side of the slidable scale, then the document analysis system 110 presents results based upon a nearest semantic similarity to one or more semantic elements included in the search query (e.g., results that are synonymous and/or otherwise similar to the search query based upon meaning).

As shown in FIGS. 7A-7D, the result configurations 710 also include a selectable element configured to designate a number of results presented to the user (e.g., via user interface 800, as described below). For instance, if a user selects "10" from the "Number of Results" drop-down menu, document analysis system 110 displays ten results in response to receiving a search query. As described herein, a user may update and/or otherwise change any of the filter elements 705 and/or the result configurations 710 after submitting a search query. In this instance, the iterative process (e.g., step 614) of computer-implemented process 600 begins and the user receives updated results, as described herein.

In addition to the filter elements 705 and the result configurations 710, user interface 700 is shown to include an input field 715 and a toggle 720. The input field 715 may be engaged with by a user (e.g., clicked on, tapped, typed in, etc.) to submit a search query. According to various embodiments, the user may submit any of a text input, a voice input, a document input, a media file, and so on, in the input field 715 as the search query.

In some embodiments, the toggle 720 refers to a selectable element included on the user interface 700 that is configured to combine filings according to an entity responsible for submitting the filings. That is, with the toggle 720 activated (e.g., shown in FIG. 8C, as described below), results shown in response to the search query submitted via user interface 700 are aggregated according to the entity responsible for submitting the filings. In some instances, if there are multiple results from the same filing, activation of the toggle 720 may combine the multiple results from the filing and display the common filing as one result (e.g., the aggregated individual result 820).

Exemplary Computer-Generated User Interface

Referring now to FIGS. 8A-8D, a computer-generated user interface, shown as user interface 800, for displaying results to a search query is shown, according to some embodiments. For instance, user interface 800 may be generated in response to a search query received via user interface 700. User interface 800 may be generated by any and/or all the components of the computing system 100 of FIGS. 1-2 (e.g., the document analysis system 110, etc.). It should be appreciated that any and/or all the user interface 800 may be generated by other systems, devices, and/or components (e.g., components of the computing system 100, the document analysis system 110, etc.). It should be appreciated that in some embodiments, user interface 800 may display additional, different, and/or fewer displays, options, icons, and/or functionality. In certain embodiments, the user interface 800 may be displayed via the user interface 122 of the user device 120.

As shown, user interface 800 may include the filter elements 705, the result configurations 710, the input field 715, and the toggle 720, each of which are described above with reference to FIGS. 7A-7D. In this way, a user viewing the results via the user interface 800 may filter the results of the search query using any of the filter elements 705, the result configurations 710, or the toggle 720. Additionally or alternatively, the user may submit an entirely new search query from user interface 800 using the input field 715.

Figure 8A:
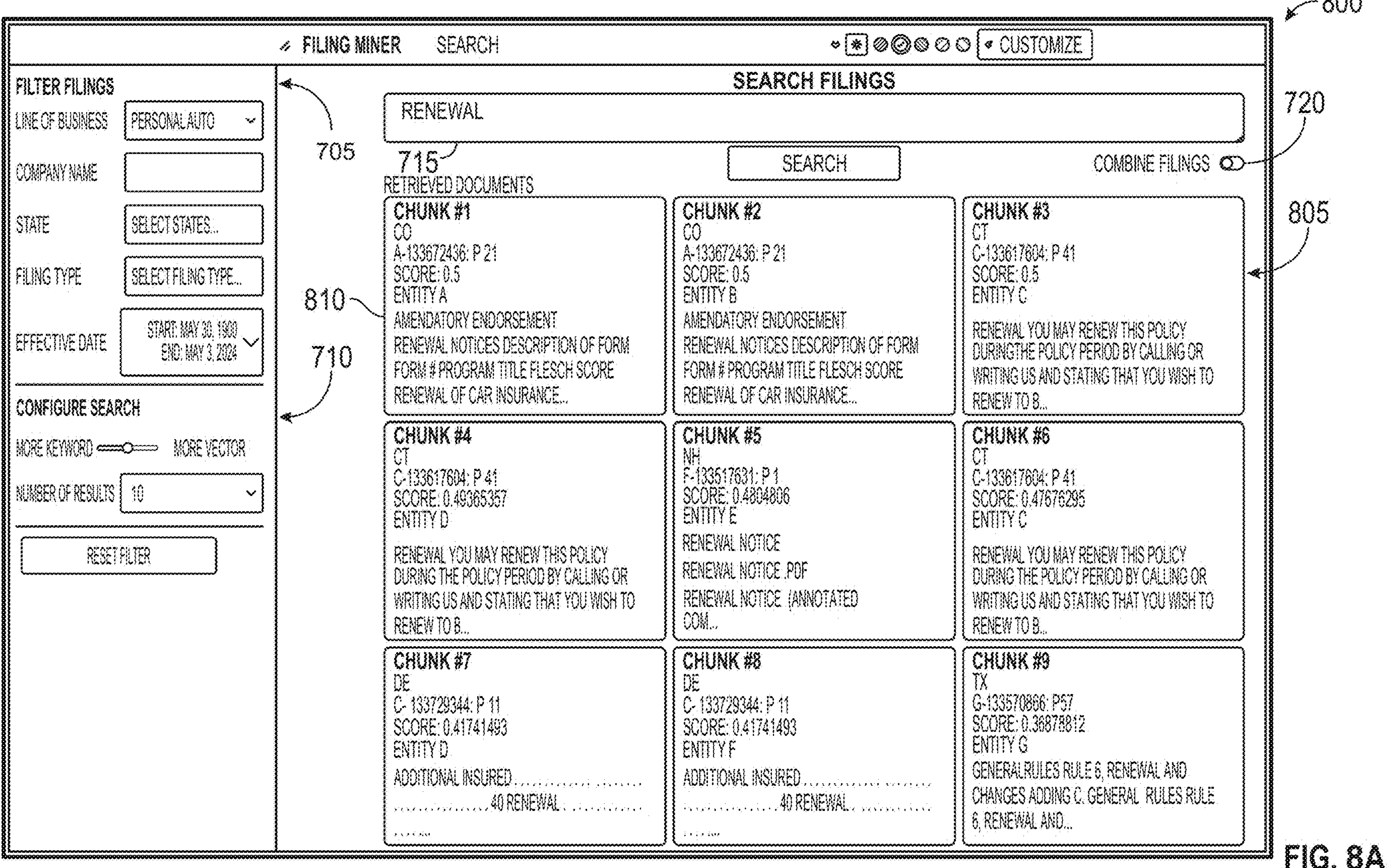
FIGS. 8A-8D are depictions of an exemplary user interface including search results to a query, according to some embodiments.
Figure 8B:
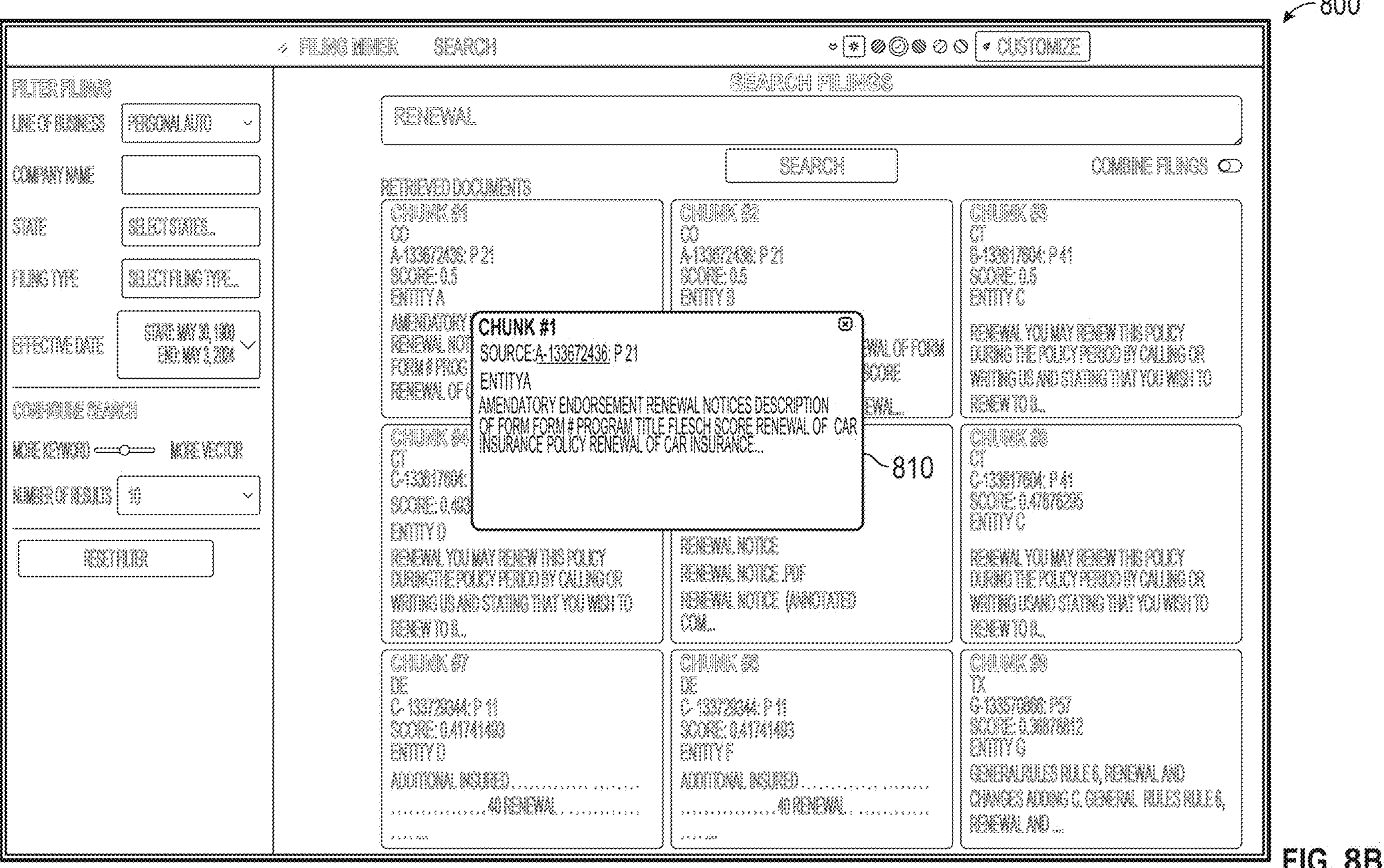

Referring to FIG. 8A, user interface 800 includes an array of results 805. The array of results 805 refers to a set of search results identified in response to a received search query (e.g., the results identified during block 610 of process 600). For instance, the array of results 805 may include the subset of the plurality of documents identified during block 608 of process 600. The array of results 805 further includes a plurality of individual results 810. Each of the plurality of individual results 810 may include a plurality of text portions corresponding to a plurality of embeddings and/or at least a portion of metadata associated with a document represented by the individual result 810. Furthermore, because the toggle 720 is shown in FIG. 8A as deactivated, the array of results 805 refers to an array where the results are not aggregated according to the entity responsible for submitting the corresponding document. A user may engage with (e.g., click on, tap, etc.) each of the plurality of individual results 810 such that the user interface 800 displays the selected individual result 810 alone (e.g., as a pop-up window, etc.), as shown in FIG. 8B. Once selected, the individual result 810 may further include a hyperlink to a source from which the result is identified (e.g., to a PDF, to a website, to any other publication, etc.).

Figure 8C:
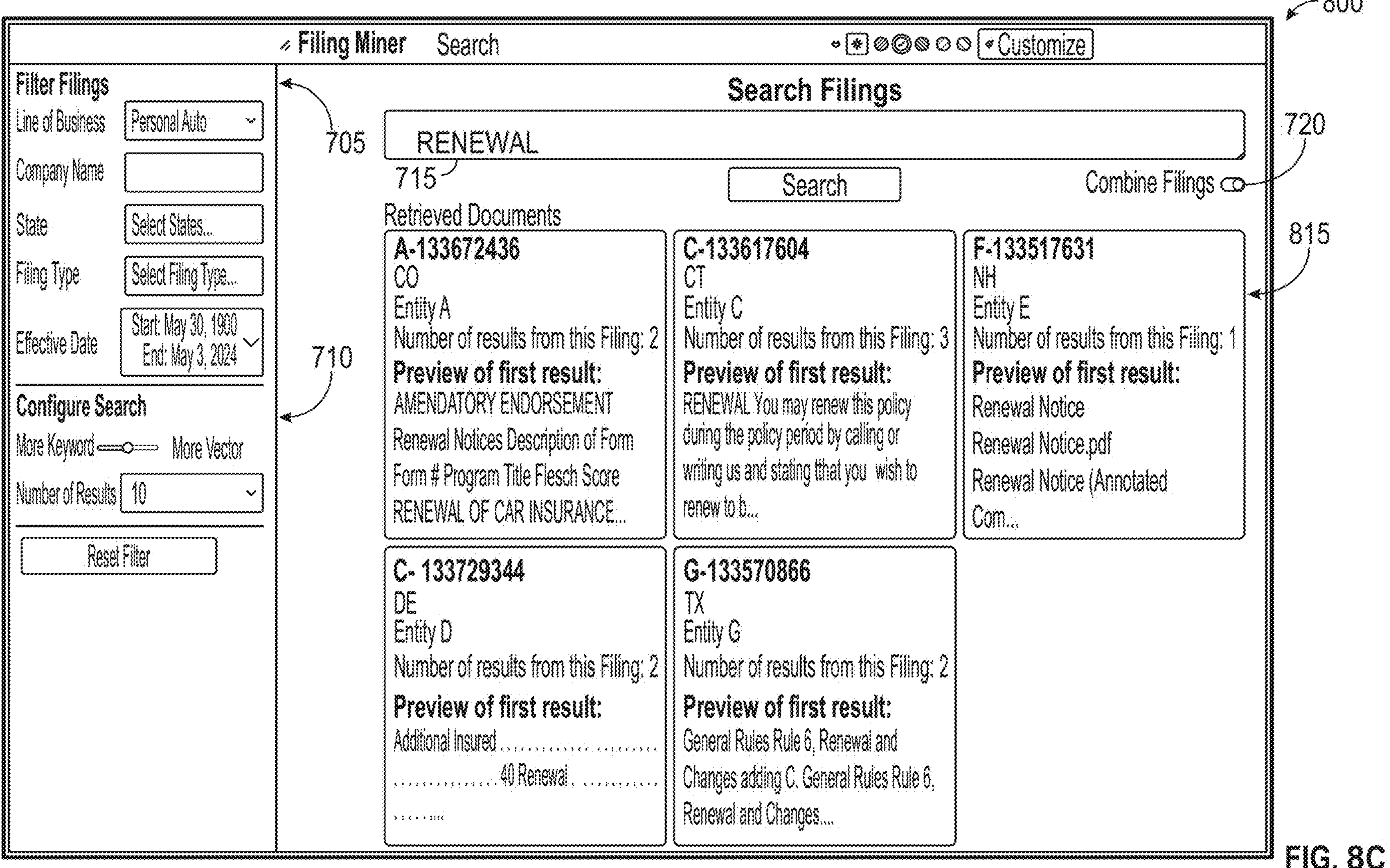
Figure 8D:
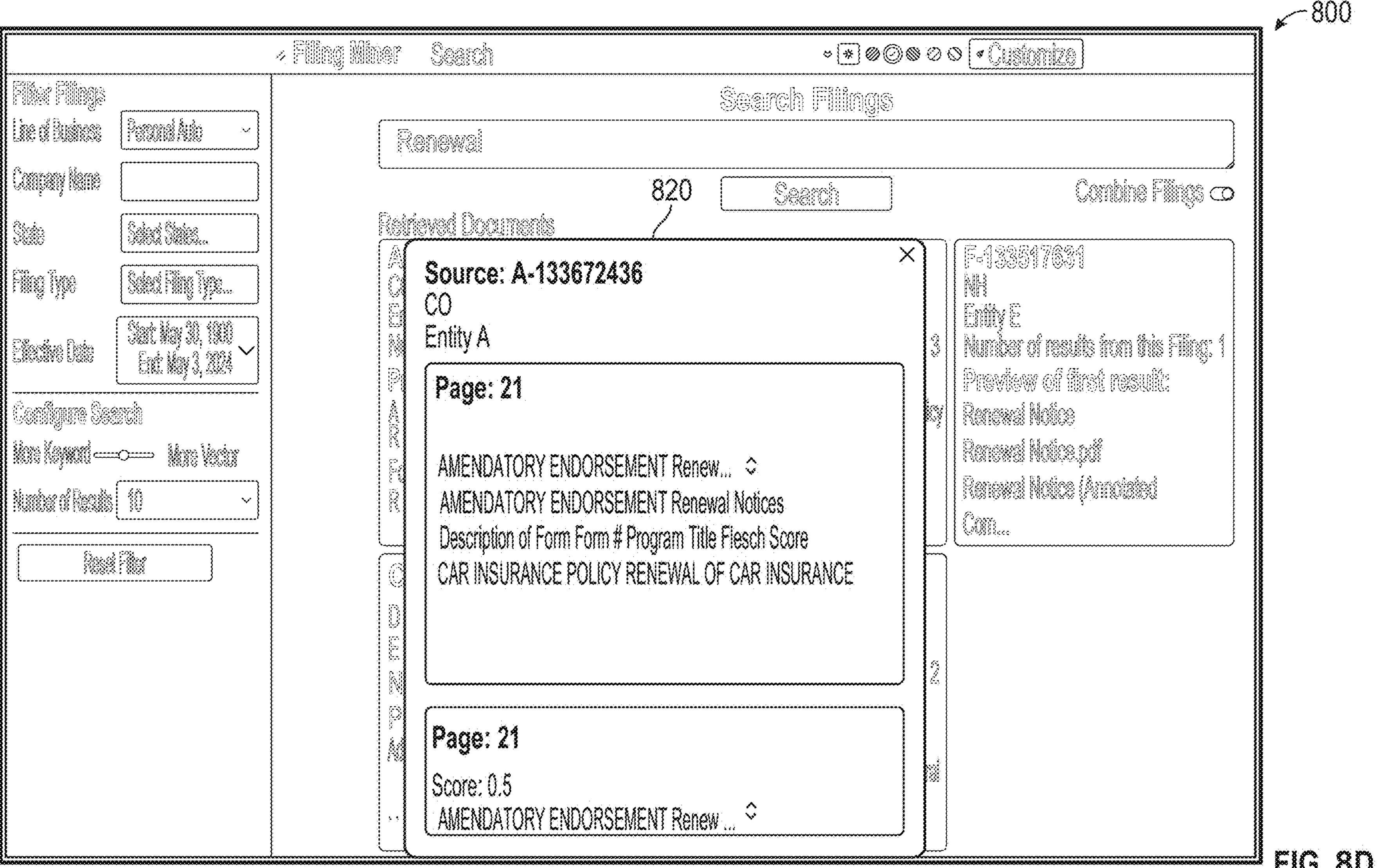

Although FIGS. 8A and 8B illustrate user interface 800 with the toggle 720 deactivated, FIGS. 8C and 8D illustrate user interface 800 with the toggle 720 activated. That is, as shown in FIG. 8C, when the toggle 720 is activated, an aggregated array of search results 815 may be displayed via the user interface 800. The aggregated array of search results 815 may include a plurality of groupings, where each of the plurality of groupings includes individual results (e.g., aggregated individual result 820, as shown in FIG. 8D) that are aggregated according to the entity responsible for submitting each individual result in the aggregated array of search results 815. Similar to user interface 700, as described above, a user of the user interface 800 may engage with (e.g., click on, tap, or otherwise select) one of the plurality of groupings included in the aggregated array of search results 815. FIG. 8D shows a selected aggregated individual result 820 included in the selected grouping from the aggregated array of search results 815.

Exemplary User Interface for Displaying Data

Figure 9A:
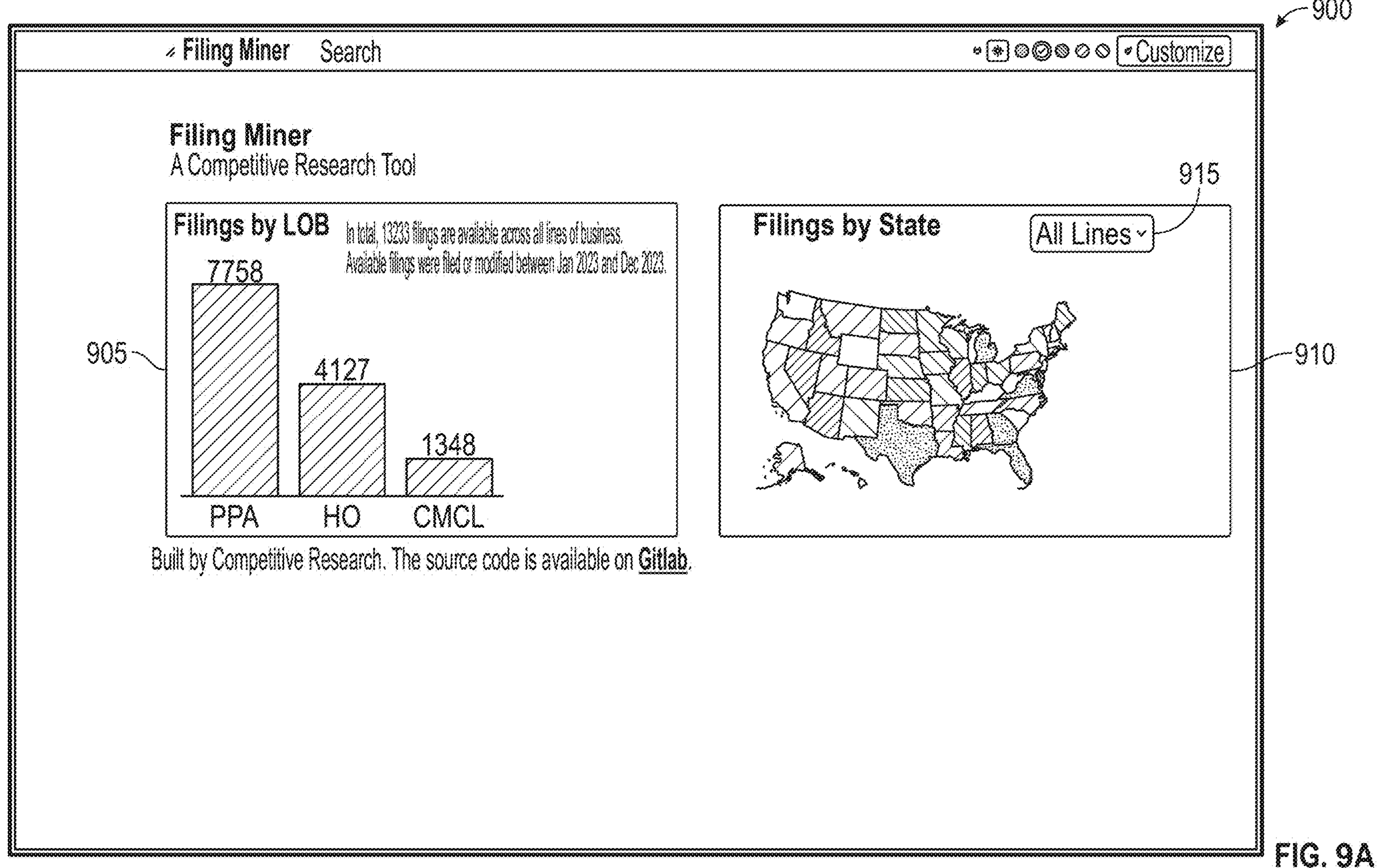
FIGS. 9A and 9B are depictions of an exemplary user interface including visual representations of search results to a query, according to some embodiments.
Figure 9B:
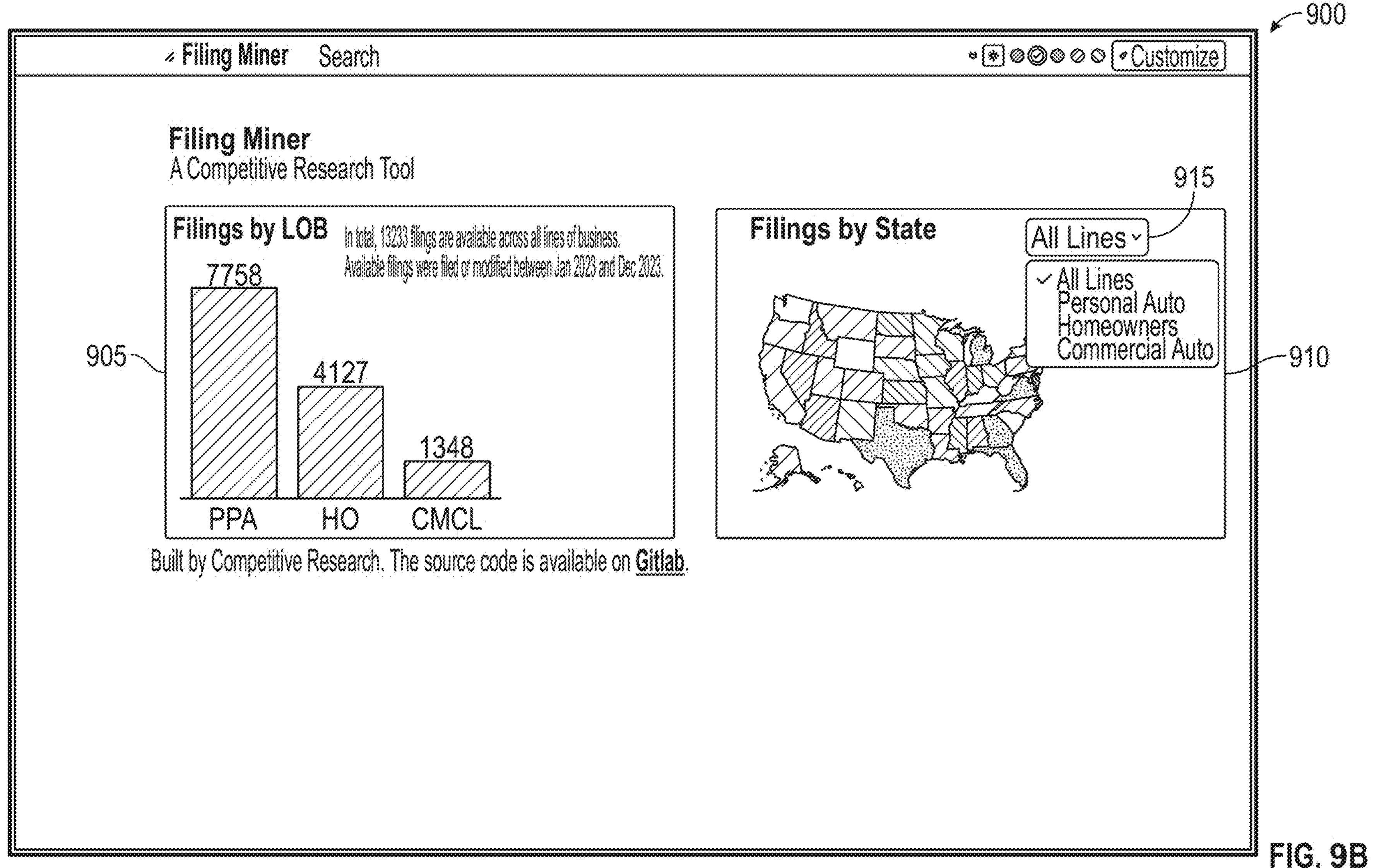

Referring now to FIGS. 9A and 9B, a computer-generated user interface, shown as user interface 900, for displaying filing data is shown, according to some embodiments. User interface 900 may be generated by any and/or all the components of the computing system 100 of FIGS. 1-2 (e.g., the document analysis system 110, etc.). It should be appreciated that any and/or all the user interface 900 may be generated by other systems, devices, and/or components (e.g., components of the computing system 100, the document analysis system 110, the machine learning model 112, etc.). It should be appreciated that in some embodiments, user interface 900 may display additional, different, and/or fewer displays, options, icons, and/or functionality. In certain embodiments, the user interface 900 may be displayed via the user interface 122 of the user device 120.

In some embodiments, the filing data shown via user interface 900 refers to data associated with the documents receivable by the document analysis system 110 (e.g., by the media extractor 250). For instance, the filing data may relate to the documents included in the publicly available database from which documents are retrieved during block 502 of process 500. As shown in FIGS. 9A and 9B, the filing data may be displayed using various visual representations including a bar chart 905 and/or a geographical map 910. The bar chart 905 may include a total number of filings available by line of business (LOB). For instance, the bar chart 905 may include a total number of filings each available in the personal auto, homeowners, and commercial auto lines of business.

The geographical map 910 may include a total number of filings by state. For instance, the geographical map 910 may represent the United States of America and may include a total number of filings available from each of the 50 states. In some embodiments, a visualization technique (e.g., shading, etc.) may be used to distinguish states associated with more filings (e.g., depicting said states in a dark shade) from the states associated with fewer filings (e.g., depicting said states in a light shade). User interface 900 may further include a drop-down menu 915 configured to filter the results shown on the geographical map 910 by lines of business. For instance, FIG. 9A depicts the geographical map 910 according to all lines of business, however, a user may select one or more lines of business (e.g., personal auto, homeowners, commercial auto, life, health, personal articles, renters, etc.) from the drop-down menu 915 to filter the results shown on the geographical map 910 (e.g., as demonstrated by selection of the drop-down menu 915 in FIG. 9B).

Exemplary Machine Learning and Generative AI

As discussed elsewhere, some embodiments may utilize machine learning, generative artificial intelligence, or other advanced computing techniques. As such, generative artificial intelligence (AI) models (also referred to as generative machine learning (ML) models) and/or other AI/ML models discussed herein may be implemented via and/or coupled to one or more voice bots and/or chatbots that may be configured to utilize artificial intelligence and/or machine learning techniques. For instance, the voice and/or chatbot may be a ChatGPT chatbot and/or a ChatGPT-based bot. The voice and/or chatbot may employ supervised, unsupervised, and/or semi-supervised machine learning techniques, which may be followed by, and/or used in conjunction with, reinforced and/or reinforcement learning techniques. The voice bot, chatbot, ChatGPT bot, ChatGPT-based bot, and/or other such generative model may generate audible or verbal output, text or textual output, visual or graphical output, output for use with speakers and/or display screens of a mobile computing device, and/or other types of output for user and/or other computer or bot consumption.

Noted above, in some embodiments, a chatbot or other computing device may be configured to implement machine learning, such that the computing device "learns" to analyze, organize, and/or process data without being explicitly programmed. Machine learning and/or artificial intelligence may be implemented through machine learning methods and algorithms. In one exemplary embodiment, a machine learning module may be configured to implement the ML methods and algorithms.

As used herein, a voice bot, chatbot, ChatGPT bot, ChatGPT-based bot, and/or other such generative model (referred to broadly as "chatbot" herein) may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network (GAN) techniques, such as the machine learning techniques, algorithms, and systems described in more detail below. In some implementations, a multimodal model, such as a multimodal generative pretrained transformer or other multimodal transformer model, may be utilized.

The chatbot may receive inputs from a user via text input, spoken input, gesture input, etc. The chatbot may then use AI and/or ML techniques as described herein to process and analyze the input before determining an output and displaying the output to the user. Depending on the embodiment, the output may be in a same or different form than the input (e.g., spoken, text, gestures, etc.), may include images, and/or may otherwise communicate the output to the user in an overarching dialogue format.

In various embodiments, at least one of a plurality of ML methods and algorithms may be applied to implement and/or train the chatbot, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, a chatbot ML module employs supervised learning, which involves identifying patterns in existing data to make predictions about subsequently received data. Specifically, the chatbot ML module may be "trained" using training data, which includes example inputs and associated example outputs. Based upon the training data, the chatbot ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, the chatbot ML module may employ unsupervised learning, which involves finding meaningful relationships in unorganized data. Unlike supervised learning, unsupervised learning does not involve user-initiated training based upon example inputs with associated outputs. Rather, in unsupervised learning, the chatbot ML module may organize unlabeled data according to a relationship determined by at least one ML method/algorithm employed by the chatbot ML module. Unorganized data may include any combination of data inputs and/or ML outputs as described above.

In yet another embodiment, the chatbot ML module may employ semi-supervised learning, which involves using thousands of individual supervised machine learning iterations to generate a structure across the multiple inputs and outputs. In this way, the chatbot ML module may be able to find meaningful relationships in the data, similar to unsupervised learning, while leveraging known characteristics or features in the data to make predictions via a ML output.

In yet another embodiment, the chatbot ML module may employ reinforcement learning, which involves optimizing outputs based upon feedback from a reward signal. Specifically, the chatbot ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In certain embodiments, the chatbot ML module may be used in conjunction with the machine vision, image recognition, object identification, AR glasses, VR headsets, other input/output devices, and/or other image processing techniques discussed below. Additionally or alternatively, in some embodiments, the chatbot ML module may be configured and/or trained to implement one or more aspects of the machine vision, image recognition, objection identification, and/or other image processing techniques discussed below.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

In some embodiments, a computer program is provided, and the program is embodied on a computer readable medium. In some embodiments, the system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method operations, actions, or functionality may be varied or re-sequenced according to alternative embodiments. Other substitutions, modifications, changes, and omissions may be made in the design, operating conditions, and arrangement of the example embodiments without departing from the scope of the present disclosure.

As used herein, an element or operation recited in the singular and proceeded with the word "a" or "an" should be understood as not excluding plural elements or operations, unless such exclusion is explicitly recited. Furthermore, references to "exemplary embodiment," "one embodiment," or "some embodiment" of the present disclosure are not intended to be interpreted as excluding the existence of additional embodiments that also incorporate the recited features.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The patent claims at the end of this document are not intended to be construed under 35 U.S.C. § 112(f) unless traditional means-plus-function language is expressly recited, such as "means for" or "step for" language being expressly recited in the claim(s).

Although the Figures show a specific order of method operations, actions, or functionality, the order of such may differ from what is depicted. Also, two or more operations, actions, or functionalities may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection operations or actions, processing operations or actions, comparison operations or actions, and decision operations or actions.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The term "coupled" and variations thereof, as used herein, means the joining of two members directly or indirectly to one another. Such joining may be stationary (e.g., permanent, or fixed) or moveable (e.g., removable, or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

In various implementations, the functionality and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular industrial environment or portion of an industrial environment. Additionally or alternatively, the operations may be performed by a combination of one or more central or offsite computing devices/servers and one or more local controllers/computing devices. All such implementations are contemplated within the scope of the present disclosure.

Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A computer system for analyzing documents and processing data using a plurality of machine learning models to identify products, the system comprising:

one or more memory devices having instructions stored thereon that, when executed by one or more processors, cause the one or more processors to perform operations comprising:

retrieving a document comprising metadata relating to the document and having a format unique to an industry with which the document is associated;

extracting media embedded in the document and generating a media file containing the extracted media and a text file containing extracted text;

analyzing, using a computer-vision model that is a first machine learning (ML) model, the media file to identify and extract data from within the extracted media;

processing, using a text extraction model that is a second ML model different from the first ML model, at least one of the text file or a text file generated from the text file to generate a plurality of text portions from the extracted text;

generating, using an embedding model that is a third ML model different from the first and second ML models, a plurality of embeddings for the plurality of text portions;

generating a dataset comprising the plurality of text portions, the plurality of embeddings, and at least a portion of the metadata, wherein the dataset includes data compatible with natural language processing (NLP) and is configured to be queried, using NLP, to provide contextual data regarding the document from the plurality of text portions; and processing the dataset to identify one or more product modifications to one or more products or to identify one or more new products based on information from the dataset.

2. The computer system of claim 1, wherein the operations further comprise generating at least one of a table, a textual summary, or a comma-separated value format comprising the extracted data from within the extracted media.

3. The computer system of claim 1, wherein the extracted text is identified by a fourth machine learning model using vectorization.

4. The computer system of claim 3, wherein the vectorization comprises storing the plurality of embeddings in a vector database, wherein the vector database is configured to be queried such that the plurality of text portions may be identified from the vector database.

5. The computer system of claim 1, wherein the operations further comprise:

generating a modified text version of the text file by applying one or more modification rules to the text file; and generating the plurality of text portions from the modified text version of the text file.

6. The computer system of claim 1, wherein the metadata comprises at least one of a unique document identifier, a date of last modification to the document, a date of submission of the document, an entity responsible for submitting the document, or a subgroup to which the entity responsible for submitting the document belongs.

7. The computer system of claim 1, wherein the operations further comprise:

receiving, from a user, a query related to the dataset;

processing, using the embedding model, the query to determine a correspondence between the query and a subset of the plurality of embeddings;

identifying, from the dataset based upon the determined correspondence, a subset of the plurality of text portions associated with the subset of the plurality of embeddings;

retrieving a subset of documents associated with the subset of the plurality of text portions; and displaying, to the user via a graphical user interface, at least one of the subset of the plurality of text portions or a subset of the metadata associated with the subset of documents.

8. The computer system of claim 7, wherein the subset of documents is identified based upon one or more search parameters associated with the query, and wherein the operations further comprise:

receiving, from the user via the graphical user interface, an updated search parameter;

identifying, based upon the updated search parameter, an updated subset of documents; and displaying, to the user via the graphical user interface, at least one of an updated subset of the plurality of text portions or an updated subset of the metadata associated with the updated subset of documents.

9. The computer system of claim 8, wherein the one or more search parameters comprise at least one of a keyword weight or a vector weight, wherein the operations further comprise:

filtering the subset of documents based upon the at least one of the keyword weight or the vector weight;

wherein the at least one of the keyword weight or the vector weight determines an amount with which the system considers a keyword similarity or a semantic similarity in the plurality of text portions when filtering the subset of documents.

10. The computer system of claim 1, wherein the operations further comprising notifying, based upon a request to receive a notification, a user that at least one of a keyword, a phrase, or an entity is detected among the extracted text.

11. A computer-implemented method for analyzing documents filed by a plurality of third-party entities using a plurality of machine learning models to identify products, the computer-implemented method comprising:

retrieving, by one or more processors, a document filed by a third-party entity of the plurality of third-party entities comprising metadata relating to the document and to the third-party entity and having a format unique to an industry with which the document is associated;

extracting, using the one or more processors, media embedded in the document and generating a media file containing the extracted media and a text file containing extracted text;

analyzing, using the one or more processors and using a computer-vision model that is a first machine learning (ML) model, the media file to identify and extract data from within the extracted media;

processing, using the one or more processors and using a text extraction model that is a second ML model different from the first ML model, at least one of the text file or a text file generated from the text file to generate a plurality of text portions from the extracted text;

generating, using the one or more processors and using an embedding model that is a third ML model different from the first and second ML models, a plurality of embeddings for the plurality of text portions;

generating, using the one or more processors, a dataset comprising the plurality of text portions, the plurality of embeddings, and at least a portion of the metadata, wherein the dataset includes data compatible with natural language processing (NLP) and is configured to be queried, using NLP, to provide contextual data regarding the document and the third-party entity from the plurality of text portions; and processing the dataset to identify one or more product modifications to one or more products or to identify one or more new products based on information from the dataset.

12. The computer-implemented method of claim 11, wherein the method further comprises:

receiving, using the one or more processors and from a user, a query related to the dataset;

processing, using the one or more processors and using the embedding model, the query to determine a correspondence between the query and a subset of the plurality of embeddings;

identifying, using the one or more processors and from the dataset based upon the determined correspondence, a subset of the plurality of text portions associated with the subset of the plurality of embeddings;

retrieving, using the one or more processors, a subset of documents associated with the subset of the plurality of text portions; and displaying, using the one or more processors and to the user via a graphical user interface, at least one of the subset of the plurality of text portions or a subset of the metadata associated with the subset of documents.

13. The computer-implemented method of claim 12, wherein the subset of documents is identified based upon one or more search parameters associated with the query, and wherein the method further comprises:

receiving, using the one or more processors and from the user via the graphical user interface, an updated search parameter;

identifying, using the one or more processors and based upon the updated search parameter, an updated subset of documents; and displaying, using the one or more processors and to the user via the graphical user interface, at least one of an updated subset of the plurality of text portions or an updated subset of the metadata associated with the updated subset of documents.

14. The computer-implemented method of claim 13, wherein the one or more search parameters comprise at least one of a keyword weight or a vector weight, and wherein the method further comprises filtering, using the one or more processors, the subset of documents based upon the at least one of the keyword weight or the vector weight.

15. The computer-implemented method of claim 11, wherein the method further comprises notifying, using the one or more processors and based upon a request to receive a notification, a user that at least one of a keyword, a phrase, or an entity is detected among the extracted text.

16. The computer-implemented method of claim 11, wherein the method further comprises generating, using the one or more processors, at least one of a table, a textual summary, or a comma-separated value format comprising the extracted data.

17. The computer-implemented method of claim 11, wherein the method further comprises:

generating, using the one or more processors, a modified text version of the text file by applying one or more modification rules to the text file; and generating, using the one or more processors, the plurality of text portions from the modified text version of the text file.

18. The computer-implemented method of claim 11, wherein the extracted text is identified by a fourth machine learning model using vectorization, and wherein the vectorization comprises storing the plurality of embeddings in a vector database, wherein the vector database is configured to be queried against by a user such that the plurality of text portions may be identified from the vector database.

19. A non-transitory computer readable medium for analyzing documents filed by a plurality of third-party entities using a plurality of machine learning models to identify products, the non-transitory computer readable medium comprising instructions stored thereon that, when executed by one or more processors, cause the one or more processors to perform operations comprising:

retrieving multiple documents, each of the multiple documents comprising metadata and having a format unique to an industry with which the document is associated, wherein the multiple documents relate to multiple topics and the plurality of third-party entities;

extracting media embedded in the multiple documents and generating a media file containing the extracted media and a text file containing extracted text;

analyzing, using a computer-vision model that is a first machine learning (ML) model, the media file to identify and extract data from within the extracted media;

processing, using a text extraction model that is a second ML model different from the first ML model, at least one of the text file or a text file generated from the text file to generate a plurality of text portions from the extracted text;

generating, using an embedding model that is a third ML model different from the first and second ML models, a plurality of embeddings for the plurality of text portions;

generating a dataset comprising the plurality of text portions, the plurality of embeddings, and at least a portion of the metadata, wherein the dataset includes data compatible with natural language processing (NLP) and is configured to be queried, using NLP, to provide contextual data regarding the multiple documents and the plurality of third-party entities from the plurality of text portions;

and processing the dataset to identify one or more product modifications to one or more products or to identify one or more new products based on information from the dataset.

20. The non-transitory computer readable medium of claim 19, wherein the instructions further cause the one or more processors to perform operations comprising:

receiving, from a user, a query related to the dataset;

processing, using the embedding model, the query to determine a correspondence between the query and a subset of the plurality of embeddings;

identifying, from the dataset based upon the determined correspondence, a subset of the plurality of text portions associated with the subset of the plurality of embeddings;

retrieving a subset of documents associated with the subset of the plurality of text portions;

displaying, to the user via a graphical user interface, at least one of the subset of the plurality of text portions or a subset of the metadata associated with the subset of documents;

wherein the subset of documents is identified based upon one or more search parameters associated with the query, and wherein the operations further comprise:

receiving, from the user via the graphical user interface, an updated search parameter;

identifying, based upon the updated search parameter, an updated subset of documents; and displaying, to the user via the graphical user interface, at least one of an updated subset of the plurality of text portions or an updated subset of the metadata associated with the updated subset of documents.

* * * * *